(12) United States Patent
Meylan et al.

(10) Patent No.: US 9,526,069 B2
(45) Date of Patent: Dec. 20, 2016

(54) EARLY INITIATION OF DORMANCY OF A RADIO CONNECTION

(71) Applicant: Qualcomm Incorporated, San Diego, CA (US)

(72) Inventors: Arnaud Meylan, San Diego, CA (US); Satashu Goel, San Diego, CA (US); Gerardo Giaretta, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 314 days.

(21) Appl. No.: 13/841,874

(22) Filed: Mar. 15, 2013

(65) Prior Publication Data

US 2013/0279385 A1   Oct. 24, 2013

Related U.S. Application Data

(60) Provisional application No. 61/636,470, filed on Apr. 20, 2012.

(51) Int. Cl.
*H04W 4/00* (2009.01)
*H04W 52/02* (2009.01)
*H04W 76/04* (2009.01)
*H04W 76/06* (2009.01)

(52) U.S. Cl.
CPC ....... *H04W 52/0225* (2013.01); *H04W 76/046* (2013.01); *H04W 76/064* (2013.01); *H04W 76/068* (2013.01)

(58) Field of Classification Search
USPC ................. 370/252, 328, 338, 401
See application file for complete search history.

(56) References Cited

U.S. PATENT DOCUMENTS 6,052,361 A * 4/2000 Ansari ............... H04Q 11/0478
                                                          370/232
7,436,779 B1   10/2008 Mangal et al.
(Continued)

FOREIGN PATENT DOCUMENTS

EP         1924110 A1     5/2008

OTHER PUBLICATIONS

Partial International Search Report—PCT/US2013/037022—ISA/EPO—Jul. 22, 2013.
(Continued)

*Primary Examiner* — Christine Ng
(74) *Attorney, Agent, or Firm* — François A. Pelaez

(57) ABSTRACT

Methods, systems, and devices are described for managing a radio connection between a mobile device and a base station of a radio access network. A determination is made that the mobile device is in a standby state. The radio connection transitions to a high power state while the mobile device is in the standby state. A net number of transport layer connections for the mobile device are identified. The transport layer connections are Transmission Control Protocol (TCP) or User Datagram Protocol (UDP) sockets. A net count of transport layer connections opened and closed while the radio connection is in the high power state is calculated. Dormancy of the radio connection is initiated when the mobile device is in the standby state, based at least in part on the calculated net count of transport layer connections.

40 Claims, 13 Drawing Sheets

(56) References Cited

U.S. PATENT DOCUMENTS

| | | | |
|---|---|---|---|
| 8,004,991 B1* | 8/2011 | Klemin | H04L 47/30 370/235 |
| 8,004,994 B1 | 8/2011 | Darisi et al. | |
| 2003/0100310 A1* | 5/2003 | Lindner | H04W 76/068 455/452.1 |
| 2007/0081547 A1 | 4/2007 | Munje | |
| 2007/0086461 A1* | 4/2007 | Ward | H04L 45/04 370/392 |
| 2007/0130341 A1* | 6/2007 | Ma | G06F 1/26 709/226 |
| 2009/0039849 A1* | 2/2009 | Chang | G05F 1/575 323/282 |
| 2010/0061245 A1* | 3/2010 | Larsen | H04L 47/2483 370/237 |
| 2011/0269463 A1* | 11/2011 | Wang | H04W 76/046 455/436 |
| 2011/0319064 A1 | 12/2011 | Lenart et al. | |
| 2012/0014301 A1 | 1/2012 | Herle et al. | |
| 2012/0020393 A1 | 1/2012 | Patil et al. | |
| 2012/0052814 A1* | 3/2012 | Gerber | H04W 72/048 455/67.11 |
| 2012/0120799 A1 | 5/2012 | Brisebois et al. | |
| 2012/0185585 A1* | 7/2012 | Bhate | H04L 63/1458 709/224 |
| 2012/0281561 A1 | 11/2012 | Shukla et al. | |

OTHER PUBLICATIONS

Research in Motion Limited: "Fast Dormancy: A way forward", 3GPP Draft; R2-084647, 3rd Generation Partnership Project (3GPP), Mobile Competence Centre ; 650, Route Des Lucioles ; F-06921 Sophia-Antipolis Cedex ; France, no. Jeju; 20080820, Aug. 20, 2008 (Aug. 20, 2008), XP050319640, [retrieved on Aug. 20, 2008].

International Search Report and Written Opinion—PCT/US2013/037022—ISA/EPO—Sep. 10, 2013.

Nokia Corporation: "UE assistance information for UE power saving and optimized network performance", 3GPP Draft; R2-121203 UE Assistance Data for EDDA, 3rd Generation Partnership Project (3GPP), Mobile Competence Centre 650, Route Des Lucioles ; F-06921 Sophia-Antipolis Cedex ; France, vol. RAN WG2, no. Jeju, Korea; Mar. 26, 2012-Mar. 30, 2012, Mar. 20, 2012 (Mar. 20, 2012), XP050606200, [retrieved on Mar. 20, 2012] 1 Introduction 2.1 UE assistance information table 1 Proposal 1.

* cited by examiner

EARLY INITIATION OF DORMANCY OF A RADIO CONNECTION

CROSS REFERENCES

The present application for Patent claims priority benefit to U.S. Provisional Patent Application No. 61/636,470, entitled "Early Initiation of Dormancy of a Radio Connection" by Meylan et al., filed Apr. 20, 2012, and assigned to the assignee hereof.

BACKGROUND

Applications or device applets are now available that operate to provide a wide range of add-on services and features to wireless devices. For example, it is now possible for wireless devices to download and launch device applets to perform value added functions such as shopping, searching, position location, driving navigation, or an array of other functions. Network and application providers generally offer these device applets to device users for additional fees. Thus, the use of device applets may increase the functionality and usability of wireless devices and offers device users features and convenience not originally available on the devices themselves.

Typically, applications transmit and receive data (e.g., updates) using connections according to a particular transmission protocol. For example, applications may establish a connection with a server of a network, such as the Internet, using Transmission Control Protocol (TCP) connections or sockets. Once these connections are established, the data may be transmitted to or received from the network server using a radio connection between the wireless device and a base station.

Radio connections, however, require power and resources. When the communication with the network is completed, the radio connection may still remain active for a certain amount of time. As a result, power and resources of the wireless device and the base station may continue to be consumed until the radio connection between the two devices is released. Further, resources of the radio access network may continue to be consumed until the radio connection is released.

SUMMARY

Methods, systems, and devices for managing a radio connection between a mobile device and a radio access network are described. In one example, a determination may be made that the mobile device is in a standby state. The determination that the mobile device is in the standby state may occur when a screen of the mobile device is determined to be inactive. While in the standby state, the radio connection may transition to a high power state, such as a forward access channel (FACH) state or a data channel (DCH) state for data transfer. Upon transitioning to the high power state, the mobile device may identify a number of transport layer connections between applications executing on the device and a network entity, such as a server. The mobile device may calculate a net count of transport layer connections that are opened and closed. When the net count satisfies a threshold, the mobile device may initiate dormancy of the radio connection. As a result, dormancy of the radio connection may be initiated immediately upon the net number of transport layer connections satisfying the threshold.

In another example, a triggering event may be detected. The triggering event may be a closing of a Transport Control Protocol (TCP) connection, a start of a non-sync traffic burst, or a start of a sync traffic burst. An inactivity timer may be selected from a plurality of inactivity timers, based on the detected event. For example, a TCP connection closed inactivity timer may be selected when the detected event is a closing of TCP connection. Similarly, a non-sync traffic burst inactivity timer or a sync traffic burst inactivity timer may be selected when the detected event is the start of a non-sync traffic burst or a sync traffic burst, respectively. The selected inactivity timer is started and upon expiration of the selected inactivity timer, the mobile device may initiate dormancy of the radio connection. As a result, dormancy of the radio connection may be initiated more quickly, based on the specific inactivity timer that is tailored for the triggering event.

In one example, a method for wireless communication using a mobile device is described. A determination may be made that the mobile device is in a standby state. In addition, a net number of transport layer connections may be identified, and dormancy of a radio connection may be initiated when the mobile device is in the standby state based at least in part on the identified net number of transport layer connections.

In one configuration, the identifying the net number of transport layer connections may occurs during a specified time period. For example, the specified time period may begin when the radio connection ceases to be available. As another example, the specified time period may be the time period that the mobile device is in an active radio state. The active radio state may include a forward access channel (FACH) state, a data channel (DCH) state, or a connected state.

In one example, a determination may be made that the mobile device is transitioning to an active radio state or transitioning out of an active radio state. In addition a number of pre-existing transport layer connections may be identified when the mobile device transitions to the active radio state or transitions out of the active radio state. Further a net count of transport layer connections may be determined after the transition of the mobile device.

In one configuration, the net count of transport layer connections may be determined from a number of transport layer connections closed after the transition of the mobile device. In addition, the net count of transport layer connections may be determined from a number of transport layer connections opened after the transition of the mobile device. The net count of transport layer connections may also be determined from a number of transport layer file descriptors closed after the transition of the mobile device. Further the net count of transport layer connections may be determined from a number of transport layer file descriptors opened after the transition of the mobile device. In one example, initiating dormancy of the radio connection may occur when a net count of transport layer connections is zero, or less than zero.

In one example, determining that the mobile device to be in the standby state may include determining that a screen of the mobile device is in an inactive state. Determining whether the screen is in the inactive state may be based on whether the screen is powered down. Further, determining whether the screen is in the inactive state may be based on whether a lack of input via the screen occurs for a predetermined period of time. In one configuration, a signaling connection release indicator (SCRI) may be generated to initiate dormancy of the radio connection.

In one configuration, a determination may be made that the mobile device is transitioning to an active radio state. A number of pre-existing transport layer connections may be identified when the mobile device transitions to the active radio state. A number of transport layer connections in existence subsequent to the mobile device entering the active radio state may be periodically counted or determined. In one example, a net count of transport layer connections while the mobile device is in the active radio state may be determined based at least in part on the periodic counting of transport layer connections.

A mobile device configured for wireless communication is also described. The mobile device may include a processor and memory in electronic communication with the processor. The memory may store executable instructions that, when executed by the processor, cause the processor to determine that the mobile device is in a standby state, identify a net number of transport layer connections, and initiate dormancy of a radio connection when the mobile device is in the standby state based at least in part on the identified net number of transport layer connections.

An apparatus configured to manage radio connections is also described. The apparatus may include means for determining that apparatus is in a standby state, means for identifying a net number of transport layer connections, and means for initiating dormancy of a radio connection when the apparatus is in the standby state based at least in part on the identified net number of transport layer connections.

A computer program product for managing radio connections is also described. The computer program product may include a non-transitory computer-readable medium storing executable instructions that, when executed by a processor, cause the processor to determine that a mobile device is in a standby state, identify a net number of transport layer connections, and initiate dormancy of a radio connection when the mobile device is in the standby state based at least in part on the identified net number of transport layer connections.

A method for conserving power of a mobile device is also described. The method may include providing a plurality of timers, detecting a traffic synchronization event, selecting one of the plurality of timers based at least in part on the detected traffic synchronization event, and determining to initiate dormancy of a radio connection upon an expiration of the selected timer.

In one example, the traffic synchronization event may be a start of a synchronous traffic burst. In another example, the traffic synchronization event may be a start of a non-synchronized traffic burst.

In some cases, a transmission control protocol (TCP) connection may be detected. In one embodiment, the method may include detecting a closing of a TCP connection. The method may additionally include selecting one of the plurality of timer based at least in part on the detected closing of the TCP connection. In some cases, a traffic burst may be detected. In one example, the traffic burst may be identified as a synchronous traffic burst or a non-synchronous traffic burst.

In some configurations, each of the plurality of timers may have a different duration. In some cases, each of the plurality of timers is associated with an event. In these cases, selecting one of the plurality of timers may include selecting a timer that is associated with the detected event. In some configurations, the selected timer may be started. The plurality of timers may be inactivity timers.

A mobile device configured for wireless communication is also described. The mobile device may include a processor and memory in electronic communication with the processor. The memory may store executable instructions that, when executed by the processor, cause the processor to provide a plurality of timers, detect a traffic synchronization event, select one of the plurality of timers based at least in part on the detected traffic synchronization event, and determine to initiate dormancy of a radio connection upon an expiration of the selected timer.

An apparatus configured to manage radio connections is also described. The apparatus may include means for providing a plurality of timers, means for detecting a traffic synchronization event, means for selecting one of the plurality of timers based at least in part on the detected traffic synchronization event, and means for determining to initiate dormancy of a radio connection upon an expiration of the selected timer.

A computer program product for managing radio connections is also described. The computer program product may include a non-transitory computer-readable medium storing executable instructions that, when executed by a processor, cause the processor to provide a plurality of timers, detect a traffic synchronization event, select one of the plurality of timers based at least in part on the detected traffic synchronization event, and determine to initiate dormancy of a radio connection upon an expiration of the selected timer.

A method for wireless communication using a mobile device is further described. The method may include determining that the mobile device is in a standby state, identifying that an application processor on the mobile device is about to enter a low power state, and initiating dormancy of a radio connection when the mobile device is in the standby state based on the identification that the application processor is about to enter the low power state.

Further scope of the applicability of the described methods and apparatuses will become apparent from the following detailed description, claims, and drawings. The detailed description and specific examples are given by way of illustration only, since various changes and modifications within the spirit and scope of the description will become apparent to those skilled in the art.

BRIEF DESCRIPTION OF THE DRAWINGS

A further understanding of the nature of the present invention may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION OF THE INVENTION

Figure 1:
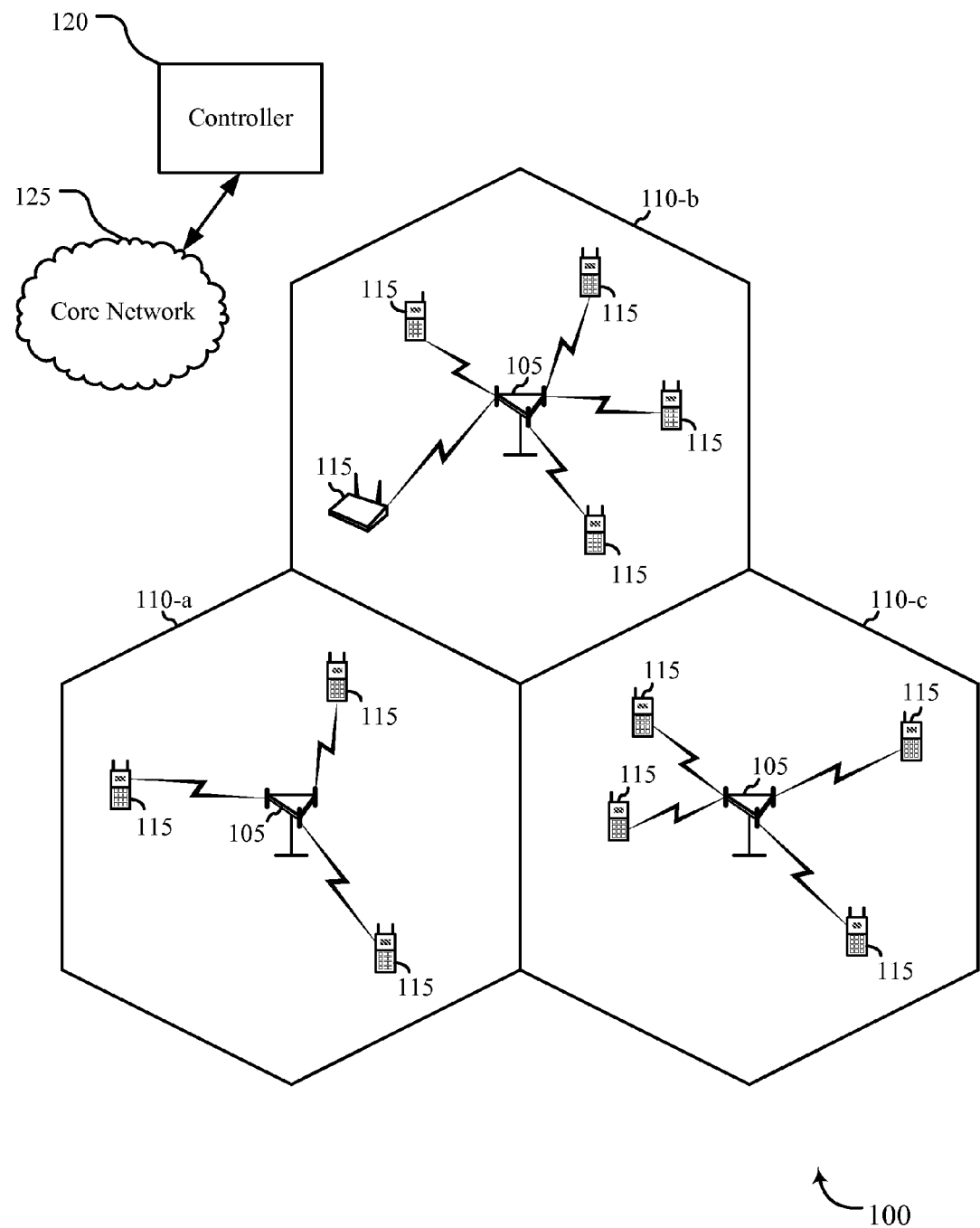
FIG. 1 shows a block diagram of a wireless communications system.

Methods, systems, and devices are described to allow a user equipment (UE) terminal to initiate a dormancy procedure at an earlier time than is currently allowed. The dormancy procedure may transition a radio connection between the UE and a device in a radio access network (RAN) (e.g., a NodeB, an evolved NodeB (eNodeB), etc.) from a high power state to a low power state. While the UE is in a standby state, the radio connection may be in a high power state to allow the UE to transmit and receive data. In one embodiment, the UE may determine a net number of transport layer connections that were opened and closed while in the high power state. For example, the UE may determine the number of Transmission Control Protocol (TCP) sockets or User Datagram Protocol (UDP) sockets that were opened and closed while the radio connection was in the high power state. In another embodiment, the UE may detect the closing of a TCP connection. In yet another embodiment, the UE may detect the start of a synchronous traffic burst or the start of a non-synchronous traffic burst. Based on the detected trigger (e.g., the determined number of connections, the closing of a TCP connection, the start of a synchronous traffic burst, the start of a non-synchronous traffic burst), the UE may initiate a dormancy procedure to transition the radio connection from the high power state to the low power state.

When the UE is in a standby state, it may connect to a RAN using a radio connection to transmit/receive data to/from a network, such as the Internet. The data may be transmitted and received across open sockets of a transport layer, such as TCP, between the UE and a server in the network. The radio connection may be in one of several power states while the UE is in the standby state. In a wireless communication system, such as Wideband Code Division Multiple Access (WCDMA) system, the radio connection may be in a low power state, such as an idle state. In the idle state, the radio connection may allow the terminal to receive small amounts of traffic, such as incoming pages. In a higher power state, such as a forward access channel (FACH) state, small amounts of data may be transferred on an uplink and downlink. For high rate data exchange, a state such as data channel (DCH) may be used. RAN resources consumed in each state may scale with the terminal's power consumption. In addition, changing from one power state to another may consume RAN resources as well as central processing unit (CPU) resources in a radio network controller (RNC) node.

Traditionally, in the WCDMA system, the RAN controls the state of the UE. In particular, the RAN controls when the radio connection with the UE should transition from a higher power to a lower power state (i.e., a dormancy procedure). Transitioning from the higher power state to a low power state may be achieved by releasing the radio connection between the UE and a NodeB, eNodeB, etc. of the RAN. Typically, the RAN uses inactivity timers to decide when to initiate dormancy for the radio connection. The inactivity timer starts (or restarts) after a burst of data is transmitted on the interface (e.g., the uplink or downlink). If the inactivity timer expires, dormancy is initiated to transition the radio connection to the low power state. The current use of inactivity timers, however, does not initiate a dormancy procedure in an efficient manner. For example, once transmission/reception of data is completed across TCP sockets using the radio connection, a lag of time may exist until the inactivity timer expires. As a result, the radio connection may remain in a higher power state for an extra amount of time, causing resources of the UE and RAN to be unnecessarily consumed.

In order to conserve resources of the UE and the RAN, it is desirable to transition the radio connection (when the UE is in a standby state) from a higher power state to a low power state in an efficient manner. This includes releasing the radio connection as soon as the transport layer connections (e.g., TCP sockets, UDP sockets, etc.) are closed.

The following description provides examples, and is not limiting of the scope, applicability, or configuration set forth in the claims. Changes may be made in the function and arrangement of elements discussed without departing from the spirit and scope of the disclosure. Various embodiments may omit, substitute, or add various procedures or components as appropriate. For instance, the methods described may be performed in an order different from that described, and various steps may be added, omitted, or combined. Also, features described with respect to certain embodiments may be combined in other embodiments.

Referring first to FIG. 1, a block diagram illustrates an example of a wireless communications system 100. The system 100 includes base stations 105 (or cells), mobile devices 115, a base station controller 120, and a core network 125 (the controller 120 may be integrated into the core network 125). The system 100 may support operation on multiple carriers (waveform signals of different frequencies).

The base stations 105 may wirelessly communicate with the mobile devices 115 via a base station antenna (not shown). The base stations 105 may communicate with the mobile devices 115 under the control of the base station controller 120 via multiple carriers. Each of the base station 105 sites may provide communication coverage for a respective geographic area. The coverage area for each base station 105 here is identified as 110-a, 110-b, or 110-c. The coverage area for a base station may be divided into sectors (not shown, but making up only a portion of the coverage area). The system 100 may include base stations 105 of different types (e.g., macro, micro, and/or pico base stations). The base stations 105 may be referred to as NodeBs, eNodeBs, etc. There may be overlapping coverage areas for different technologies.

The mobile devices 115 may be dispersed throughout the coverage areas 110. The mobile devices 115 may be referred to as mobile stations, mobile devices, access terminals (ATs), user equipments (UEs), subscriber stations (SSs), or subscriber units. The mobile devices 115 may include cellular phones, smartphones, and wireless communications devices, but may also include personal digital assistants (PDAs), other handheld devices, netbooks, notebook computers, etc.

In one configuration, the mobile device 115 may include an architecture to initiate a dormancy procedure for a radio connection. This architecture may determine that the mobile device 115 is in a standby state. Upon determining that the device 115 is in a standby state, the architecture may detect when a radio connection between the device 115 and a base station 105 transitions to a high power state. Upon transitioning to a high power state, the architecture may identify existing transport layer connections between the device 115 and a server of a network, such as the Internet. The architecture of the device 115 may also determine a net count of transport layer connections opened and closed, over a time period. The time period may be while the radio connection is in the high power state or the time period may begin when the radio connection ceases to be available. When the net count satisfies a certain threshold, the architecture may initiate a dormancy procedure to transition the radio connection from the high power state to a low power state. The procedure may lead to releasing the radio connection between the device 115 and the base station 105. The device 115 may also select between a plurality of timers when a traffic synchronization event is detected. For example, the device 115 may select a first timer when a synchronous burst of traffic is detected and may select a second timer when a non-synchronous burst of traffic is detected. The architecture of the device 115 may also detect a closing of a TCP connection. Upon detecting a closing of a TCP connection, the device 115 may also select between the plurality of timers. For example, the device 115 may select a third timer when a closing of a TCP connection is detected. Upon expiration of the selected timer, the dormancy procedure may be initiated. In one example, the values of the first, second, and third timers may be different.

Figure 2:
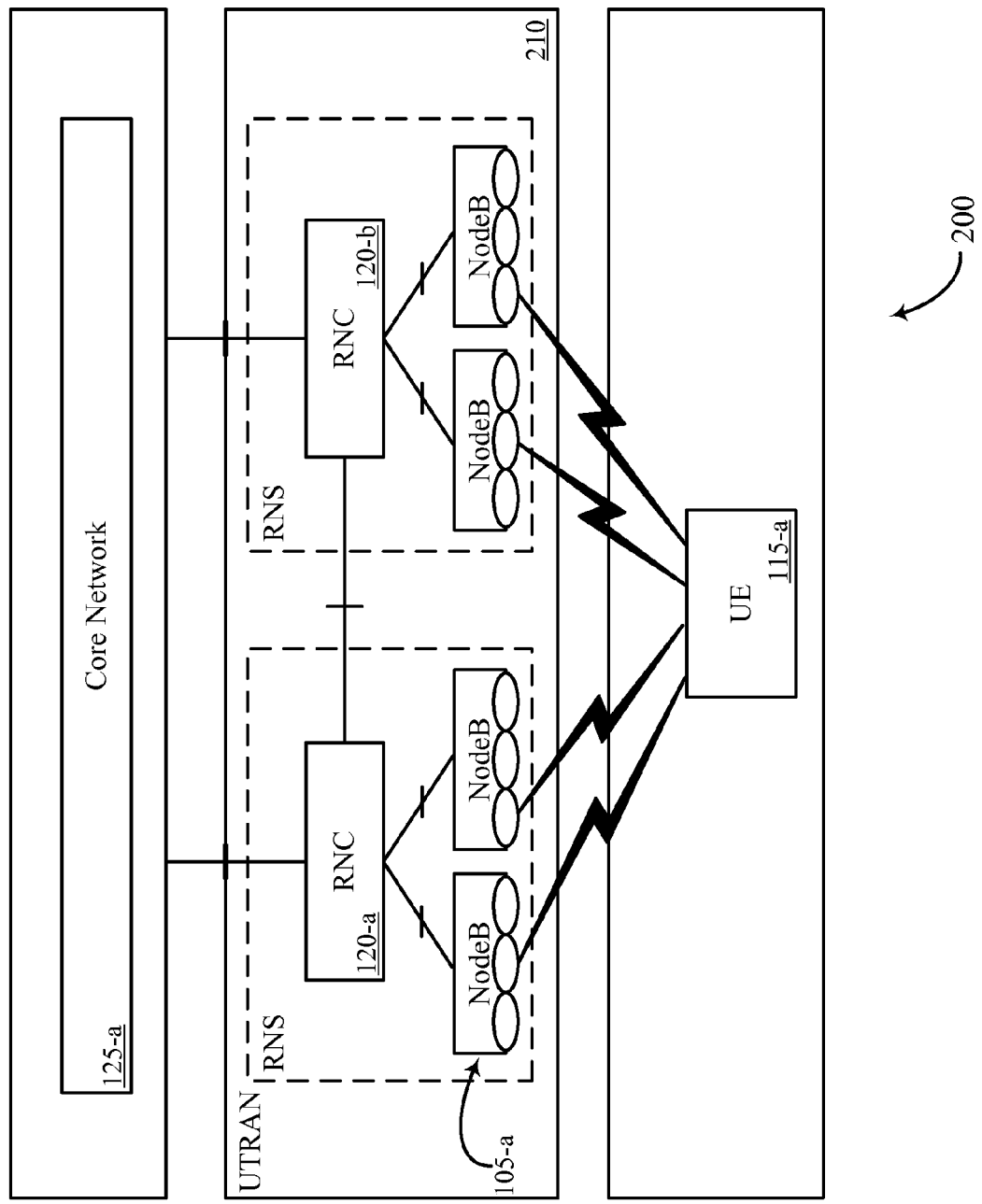
FIG. 2 shows a block diagram illustrating further example of the wireless communication system.

Referring next to FIG. 2, a block diagram illustrates an example of a wireless communications system 200. The system 200 may be an example of the system 100 described with reference to FIG. 1. NodeBs 105-a (or eNodeBs) and radio network controllers (RNCs) 205 are parts of wireless communications system 200. In the illustrated example, the system includes a Universal Mobile Telecommunications System (UMTS) Terrestrial Radio Access Network (UTRAN) 210. A UTRAN 210 is a collective term for the NodeBs 105 (or base stations) and the control equipment for the NodeBs 105 (or RNC 120) it contains which make up the UMTS radio access network. This may be a 3G communications network which is capable of carrying both real-time circuit switched and IP-based packet-switched traffic types. The UTRAN 210 may provide an air interface access method for the user equipment (UE) 115-a, which is an example of the mobile device 115 of FIG. 1. Connectivity may be provided between the UE 115-b and the core network 125-a by the UTRAN 210. The UTRAN 210 may transport data packets to multiple UEs 115-a.

The UTRAN 210 is connected internally or externally to other functional entities by a number of interfaces. The UTRAN 210 may be in communication with a core network 125-a via external interface supported by RNCs 120. In addition, the RNCs 210 manage a set of base stations called NodeBs 105-a. RNCs 120 may be in communication with each other, as well. The UTRAN 210 is largely autonomous from the core network 125-a because the RNCs 210 may be interconnected. The NodeBs 105-a may be in wireless communication with the UE 115-a. The system may be further connected to additional networks (not shown), such as a corporate intranet, the Internet, or a conventional public switched telephone network, and may transport data packets between each UE 115-a and such outside networks.

Each RNC 210 may fill multiple roles. First, it may control the admission of new UEs 115-a or services attempting to use the NodeB 105. Second, from the NodeB 105, or base station, point of view, the RNC 120 is a controlling RNC 120. Controlling admission ensures that UEs 115-a are allocated radio resources (bandwidth and signal/noise ratio) up to what the network has available. An RNC 210 may terminate the UE's 115-a control plane communications. For example, a radio connection between the UE 115-a and a NodeB 105 may enter a high power state while the UE 115-a is in an active state. The UE 115-a may initiate a dormancy procedure based upon one or more trigger conditions (e.g., a net count of open sockets satisfies a threshold, a closing of a Transmission Control Protocol (TCP) connection, a start of a synchronous traffic burst, a start of a non-synchronous traffic burst). The RNC 210 may execute the dormancy procedure by terminating the radio connection between the UE 115-a and the NodeB 105.

For an air interface, UMTS often uses a wideband spread-spectrum mobile air interface known as WCDMA. WCDMA uses a direct sequence code division multiple access signaling method (or CDMA) to separate users. WCDMA is a third generation standard for mobile communications. WCDMA evolved from GSM (Global System for Mobile Communications)/GPRS a second generation standard, which is oriented to voice communications with limited data capability. The first commercial deployments of WCDMA are based on a version of the standards called WCDMA Release 99.

In one example, traffic is transported using a transport protocol, such as User Datagram Protocol (UDP) of Transport Control Protocol (TCP). For instance, the UE 115-a may connect to a server of a network, such as the Internet, via one or more TCP connections and/or UDP connections. Each connection (e.g., TCP connection, UDP connection) may support one or more communication sockets. In one example, traffic may be transported between the UE 115-a and the server of a network, such as the Internet, using one or more communication sockets and/or one or more connections. In one example, a traffic burst is the traffic within one radio connection. As described herein, the UE 115-a may initiate a dormancy procedure based on one or more triggers. In one example, UE 115-a may initiate a dormancy procedure upon determining that the net count of open transport layer sockets between the UE 115-a and a server of a network, such as the Internet, satisfies a threshold. In another example, the UE 115-a may initiate a dormancy procedure upon the closing of a TCP connection. In yet another example, the UE 115-a may initiate a dormancy procedure based on the type of traffic burst that is being communicated.

Figure 3:
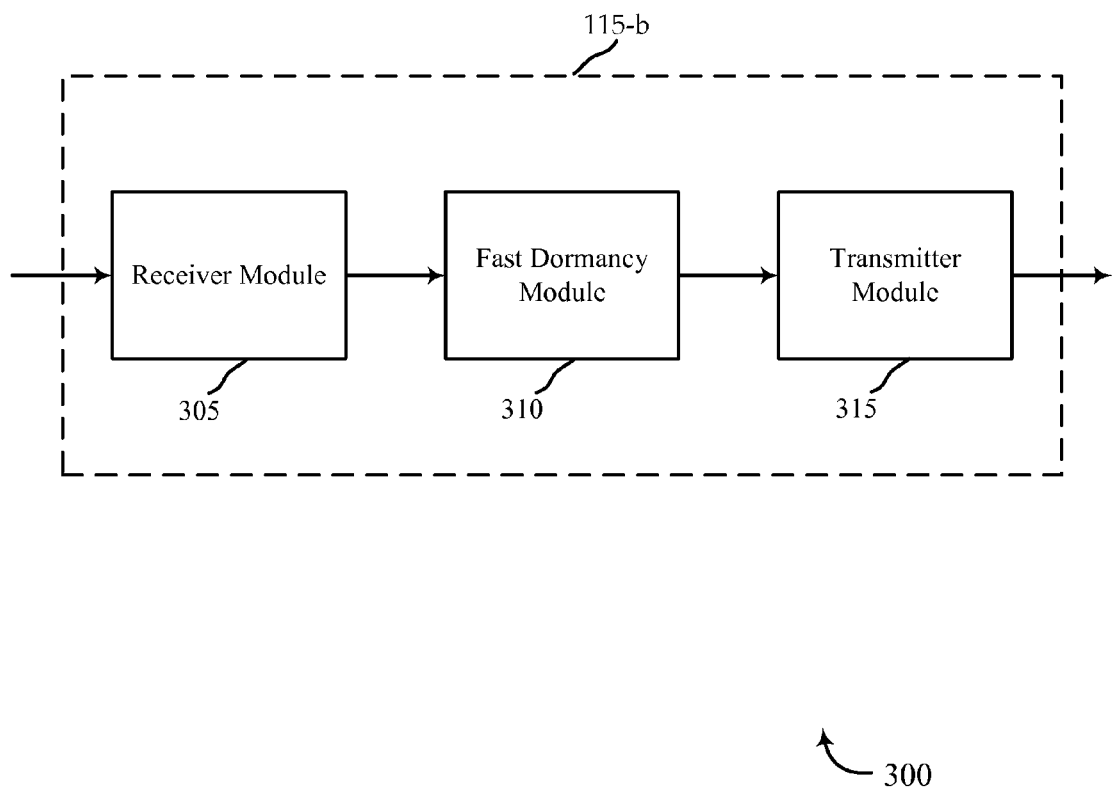
FIG. 3 is a block diagram illustrating one embodiment of a mobile device, in accordance with the present systems and methods.

FIG. 3 is a block diagram 300 illustrating one embodiment of a mobile device 115-b, in accordance with the present systems and methods. The mobile device 115-b may be an example of the mobile device 115 of FIG. 1 or 2. The mobile device 115-b may include a receiver module 305, a fast dormancy module 310, and a transmitter module 315. The mobile device 115-b may include other module not shown in FIG. 3.

These components of the mobile device 115-b may, individually or collectively, be implemented with one or more application-specific integrated circuits (ASICs) adapted to perform some or all of the applicable functions in hardware. Alternatively, the functions may be performed by one or more other processing units (or cores), on one or more integrated circuits. In other embodiments, other types of integrated circuits may be used (e.g., Structured/Platform ASICs, Field Programmable Gate Arrays (FPGAs), and other Semi-Custom ICs), which may be programmed in any manner known in the art. The functions of each unit may also be implemented, in whole or in part, with instructions embodied in a memory, formatted to be executed by one or more general or application-specific processors.

In one configuration, the receiver module 305 may include a cellular receiver and the transmitter module 315 may include a cellular transmitter. In one example, the receiver module 305 and the transmitter module 315 may allow the mobile device 115-b to communicate with one or more base stations 105. The fast dormancy module 310 may determine when to initiate a dormancy procedure to transition a radio connection to a low power state. In some configurations, the fast dormancy module 310 may initiate a dormancy procedure based on one or more trigger conditions. Details regarding the fast dormancy module 310 will be described below.

Figure 4:
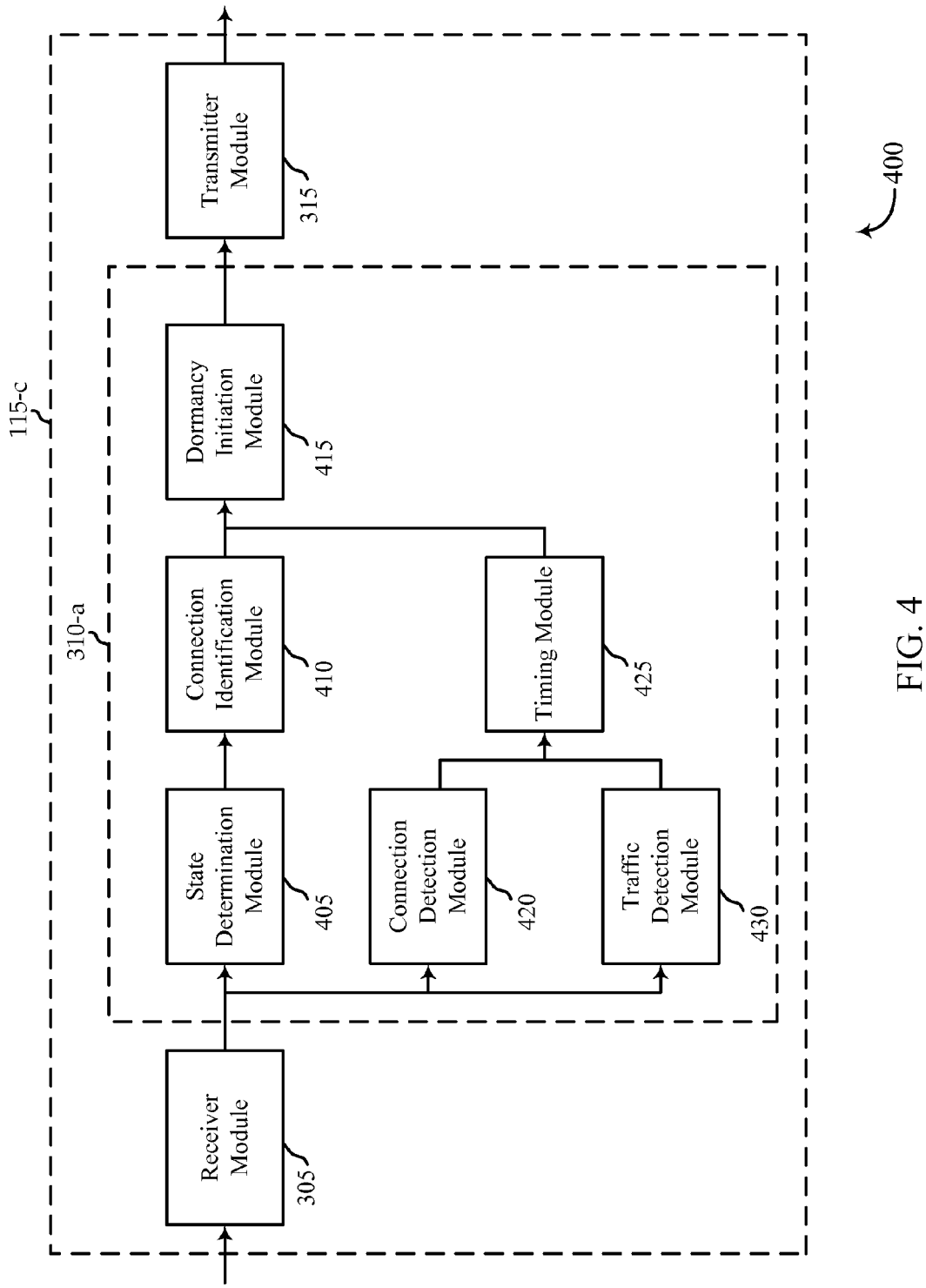
FIG. 4 is a block diagram illustrating another embodiment to of a mobile device in accordance with the present systems and methods.

FIG. 4 is a block diagram 400 illustrating another embodiment to of a mobile device 115-c in accordance with the present systems and methods. The mobile device 115-c may be an example of the mobile device 115 illustrated in FIGS. 1, 2, and/or 3. The mobile device 115-c may include the receiver module 305, a fast dormancy module 310-a, and the transmitter module 315, as previously described. Each of these components may be in communication with each other.

These components of the mobile device 115-c may, individually or collectively, be implemented with one or more application-specific integrated circuits (ASICs) adapted to perform some or all of the applicable functions in hardware. Alternatively, the functions may be performed by one or more other processing units (or cores), on one or more integrated circuits. In other embodiments, other types of integrated circuits may be used (e.g., Structured/Platform ASICs, Field Programmable Gate Arrays (FPGAs), and other Semi-Custom ICs), which may be programmed in any manner known in the art. The functions of each unit may also be implemented, in whole or in part, with instructions embodied in a memory, formatted to be executed by one or more general or application-specific processors.

In one example, the fast dormancy module 310-a may include a state determination module 405, a connection identification module 410, and a dormancy initiation module 415. Additionally or alternatively, the fast dormancy module 310-a may also include a connection detection module 420 and a traffic detection module 430.

The state determination module 405 may determine the state of the mobile device 115-c. For example, the state determination module 405 may analyze certain characteristics of the mobile device 115-c to determine whether the mobile device 115-c is in an active state or a standby state. Characteristics that may determine the state of the mobile device 115-c may include a state of an input/output device of the mobile device 115-c, a predetermined window of time, a power supply level of the mobile device 115-c, etc. The state determination module 405 may further determine a power state of the mobile device 115-c. For example, the state determination module 405 may determine whether the mobile device 115-c is in a low or high power state. In one example, the state determination module 405 may determine when the radio connection between the mobile device 115-c and a NodeB, eNodeB, etc. transitions to a high power state.

The connection identification module 410 may identify certain connections between the mobile device 115-c and another device or entity. In one configuration, the module 410 may identify transport layer connections between the mobile device 115-c and a server of a network, such as the Internet. The transport layer connections may be TCP sockets, UDP sockets, etc. The connection identification module 410 may determine a total number of connections, a net count of connections during a certain time period, etc. The time period may be while the radio connection is in the high power state or the time period may begin when the radio connection ceases to be available.

The dormancy initiation module 415 may initiate a dormancy procedure to transition the UE 115-c from a high power state to a low power state. The transition from a high power state to a low power state may occur by releasing a radio connection between the UE 115-c and a NodeB, eNodeB, or other type of base station in an RAN. The dormancy initiation module 415 may determine to initiate the procedure based on one or more triggers. In one example, the dormancy initiation module 415 may be triggered depending on the net number of connections identified by the connection identification module 410. In another example, the dormancy initiation module 415 may be triggered based on the closing of a TCP connection detected by the connection detection module 420. In yet another example, the dormancy initiation module 415 may be triggered based on the type of traffic that is detected by the traffic detection module 430. Further details regarding the fast dormancy module 310-a will be described below.

The connection detection module 420 may detect TCP connections between the mobile device 115-c and another device or entity. The connection detection module 420 may detect the closing of a TCP connection. For example, the connection detection module 420 may determine that a TCP connection has closed by either keeping a count of number of TCP connections or by listening to a callback that triggers whenever a TCP connection is closed. Upon detecting the closing of a TCP connection, the connection detection module 420 may trigger the timing module 425 to start an inactivity timer (e.g., a TCP connection closed inactivity timer).

The traffic detection module 430 may identify different types of traffic bursts and may trigger different inactivity timers based on different types of traffic bursts. For example, the traffic detection module 430 may detect sync traffic bursts and non-sync traffic bursts. A traffic burst may be the traffic within one radio connection (a data transaction separated by other data transactions by at least a network inactivity timer, for example). A sync traffic burst starts when a sync timer expires (at least one socket call is queued until the expiration of the sync timer, for example). Other traffic bursts may be non-sync traffic bursts. In one example, the traffic detection module 430 may detect a sync traffic burst based on a determination that a traffic burst starts upon the expiration of the sync timer. Upon detecting a sync traffic burst, the traffic detection module 430 may trigger the timing module 425 to start a first inactivity timer (e.g., a sync traffic burst inactivity timer). Upon detecting a non-sync traffic burst, the traffic detection module 430 may trigger the timing module 425 to start a second inactivity timer (e.g., a non-sync traffic burst inactivity timer).

The timing module 425 may select an inactivity timer based on a received trigger and may start the selected inactivity timer. Upon expiration of the selected inactivity timer, the timing module 425 may trigger the dormancy initiation module 415 to initiate a dormancy procedure, as described. In some embodiments, the timing module 425 may include a plurality of different inactivity timers. Using different inactivity timers for different triggering events may allow for increased power savings.

Figure 5:
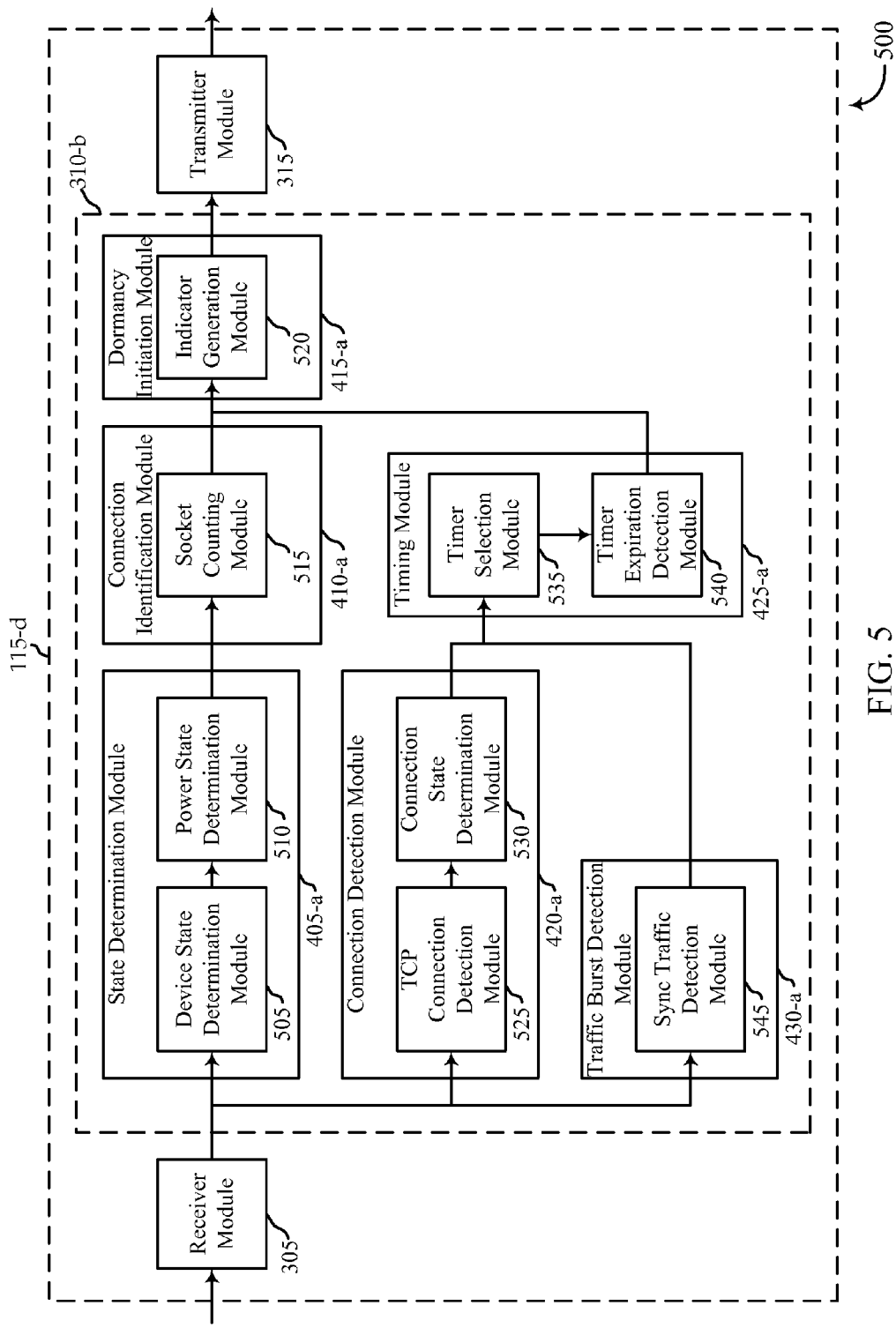
FIG. 5 is a block diagram illustrating an example architecture of a mobile device that includes a fast dormancy module.

FIG. 5 is a block diagram 500 illustrating an example architecture of a mobile device 115-*d* that includes a fast dormancy module 310-*b*. The device 115-*d* may be an example of the mobile device 115 of FIGS. 1, 2, 3, and/or 4. The module 310-*b* may be an example of the fast dormancy module 310 of FIG. 3 or 4. In one embodiment, the module 310-*b* may be useful to initiate a transition of a radio connection from a high power state to a low power state in an efficient manner. In one example, the module 310-*b* may include a state determination module 405-*a* to determine the state of the UE, a connection identification module 410-*a* to identify a net count of transport layer sockets, a connection detection module 420-*a* to detect the closing of a TCP connection, a traffic detection module 430-*a* to detect different types of traffic bursts, a timing module 425-*a* to select an inactivity timer based on the triggering event, and a dormancy initiation module 415-*a* to initiate a dormancy procedure.

In one configuration, the state determination module 405-*a* may include a device state determination module 505 and a power state determination module 510. The device state determination module 505 may use the state of the screen of the UE, the state of connectors (Universal Serial Bus (USB), High-Definition Multimedia Interface (HDMI)) of the UE, the state of a microphone (e.g., on/off) of the UE, the state of audio playback, etc. to determine whether the device is in an active or a standby state. In one example, the screen of the UE may be active or inactive. An active determination may be reached if the screen is powered on, receiving user input, interfacing with the user (e.g., screen is a touch screen), etc. Conversely, an inactive determination may be reached if the screen is powered off, if the screen has not received user input for a certain period of time, etc. If the state of the screen is active, the state determination module 405-*a* may classify the UE as being in an active state. If, however, the state of the screen is inactive, the state determination module 405-*a* may classify the UE as being in a standby state.

The power state determination module 510 may determine a power state of a radio connection between the UE and a NodeB, eNodeB, or other type of base station in a RAN. The power state may be a low power consumption state, such as an idle state, in which the UE receives small amounts of traffic, such as incoming pages via the radio connection. In addition, the power state may be a higher power consumption state, such as a FACH state, in which small amounts of data may be transferred via the radio connection on the uplink and downlink between the UE and the base station. Further, a higher power state may also include a DCH state, which provides a high rate of data exchange via the radio connection. Power consumption in the DCH state by the radio connection may be the highest as compared to the power consumption of the FACH or idle state. The UE may be considered to be in an active radio state when the power state is determined to be in a higher power state (e.g., the FACH state or the DCH state).

The connection identification module 410-*a* may include a socket counting module 515. The socket counting module 515 may count the number of open sockets when the UE is determined to be in an active radio state (e.g., a FACH or DCH state). In particular, the module 515 may determine a net count of sockets opened and closed over a time period. The time period may be while the radio connection is in the high power state or the time period may begin when the radio connection ceases to be available. For example, when the power state determination module 510 determines the radio connection for the UE has transitioned from a low power state to a higher power state, the socket counting module 515 may begin to count the number of transport layer connections, such as TCP or UDP sockets, opened while in the higher power state. The socket counting module 515 may also count the number of transport layer connections closed during the higher power state. In one configuration, the socket counting module 515 may subtract the number of closed connections from the number of opened connections to obtain the net count of transport layer connections while the radio connection is in the higher power state. Based on the net count, the connection identification module 410-*a* may trigger the dormancy initiation module 415-*a* to initiate a dormancy procedure.

For example, if the net count is zero or less than zero, the connection identification module 410-*a* may trigger the dormancy initiation module 415-*a* to initiate a dormancy procedure. The net count may be less than zero if a transport layer connection existed (i.e., was opened) prior to the radio connection transitioning to the higher power state. For example, a long-lived TCP socket or connection may be opened when the radio connection is in an idle state. The connection may remain opened when the radio connection transitions to a higher power state. While in the higher power state, the UE may open and close two short-lived TCP sockets. In addition, the long-lived TCP socket may also be closed. Thus, the net count determined by the socket counting module may be less than zero (2 opened sockets-3 closed sockets).

The connection detection module 420-*a* may include a TCP connection detection module 525 and a connection state determination module 530. The TCP connection detection module 525 may detect one or more (e.g., each) TCP connections. The connection state determination module 530 may determine when a (e.g., each) TCP connection is closed. To ensure that activity on other TCP connections has ended, a small inactivity timer may be used after a TCP connection is closed. Upon detecting that a TCP connection has closed, the connection state determination module 530 may trigger the timing module 425-*a* to start a TCP connection closed inactivity timer.

The traffic detection module 430-*a* may include a sync traffic detection module 545. The sync traffic detection module 545 may determine whether the traffic burst is a sync traffic burst or a non-sync traffic burst. In one example, the sync traffic detection module 545 may detect that a traffic burst is a sync traffic burst when the traffic burst is sent upon the expiration of a sync timer. If the traffic burst is sent without regard to a sync timer (e.g., non-synchronous traffic), the sync traffic detection module 545 may detect that the traffic burst is a non-sync traffic burst. Upon detecting that the traffic burst is a sync traffic burst or a non-sync traffic burst, the sync traffic detection module 545 may trigger the timing module 425-*a* to select the appropriate inactivity timer (e.g., sync traffic burst inactivity timer or non-sync traffic burst inactivity timer). In one example, the non-sync traffic burst inactivity timer may be shorter than the sync traffic burst inactivity timer.

In some embodiments, the timing module 425-*a* may include a timer selection module 535 and a timer expiration detection module 540. The timer selection module 535 may select a timer (from a plurality of timers, for example) based on the triggering event. For example, if the triggering event is a closing of a TCP connection, then the timer selection module 535 may select the TCP connection closed inactivity timer. If the triggering event is traffic synchronization event (e.g. a start of a synchronous traffic burst), then the timer selection module 535 may select the sync traffic burst inactivity timer. Similarly, if the triggering event is a traffic synchronization event (e.g., a start of a non-synchronous traffic burst), then the timer selection module 535 may select the non-sync traffic burst inactivity timer. The timer selection module 535 may start the selected timer. In the case that multiple triggering events occur, the timer selection module 535 may select the shortest inactivity timer among the triggered inactivity timers. The timer expiration detection module 540 may monitor the status of the selected inactivity timer and may trigger the dormancy initiation module 415-a to initiate a dormancy procedure upon the expiration of the selected inactivity timer.

In one example, the dormancy initiation module 415-a may include an indicator generation module 520 that may generate an indicator to initiate a dormancy procedure. For example, the indicator generation module 520 may generate a signaling connection release indicator (SCRI) that indicates to the base station of the RAN that the radio connection is no longer needed. In response to receiving this indicator, the RAN may initiate a transition of the radio connection to a lower power state. As a result, the architecture of the mobile device 115-d that includes the fast dormancy module 310-b allows the mobile device 115-d to initiate the dormancy procedure in an efficient manner by generating the SCRI as soon as it is determined that the radio connection is not needed anymore (when the net count of sockets opened and closed during a traffic state is equal to (or less than) zero, when a TCP connection closes, and/or when a sync or non-sync traffic burst starts, for example). The lag of time before initiating the procedure due to the use of inactivity times in the RAN is eliminated. Thus, the radio connection is transitioned to the low power state as soon as possible and therefore power and spectral resources of the mobile device 115-d and RAN, respectively, are preserved.

Figure 6:
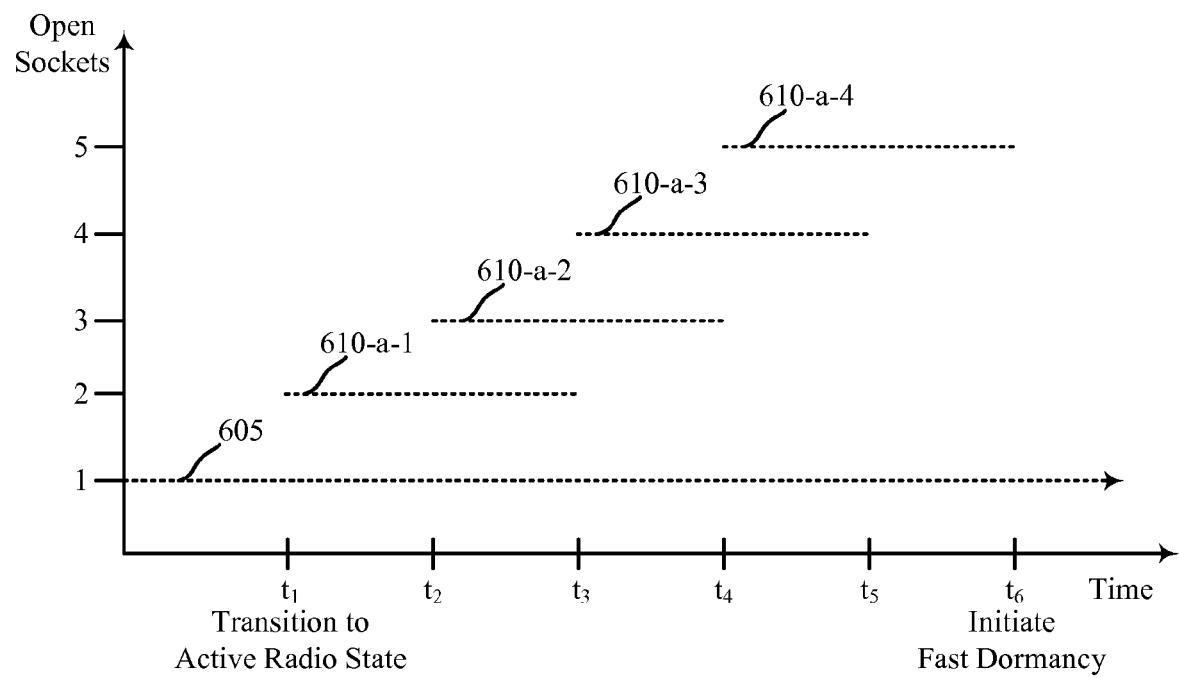
FIG. 6 shows a timing diagram for a number of transport layer connections.

FIG. 6 shows a timing diagram 600 for a number of transport layer connections, such as TCP or UDP sockets. The results of the timing diagram 600 may result in the mobile device 115 of FIG. 1, 2, 3, 4, or 5 initiating a procedure to transition a radio connection to a low power state.

In one example, a long-lived open TCP socket 605 may exist prior to a first time period, $t_1$. At the time $t_1$, a radio connection between a mobile device and a base station may transition to high power state. As a result, the mobile device transitions to an active radio state. As illustrated, the mobile device may remain in the active radio state from time $t_1$ through time $t_6$. At time $t_1$, a first short-lived TCP socket 610-a-1 (or connection) may be opened. Similarly, at times $t_2$, $t_3$, and $t_4$, a second 610-a-2, third 610-a-3, and fourth 610-a-4 TCP socket may be opened, respectively. As shown by the example timing diagram 600, at times $t_3$, $t_4$, $t_5$, and $t_6$, the first, second, third, and fourth TCP connections are closed, respectively. Thus, each of the four short-lived TCP connects 610 are opened and closed while the UE is in an active radio state (e.g., the radio connection is in a high power state). In this example, the long-lived TCP socket 605 may remain open after the time $t_6$. As a result, the net count of active TCP sockets while the mobile device is in the active radio state is zero (4 closed TCP sockets-4 opened TCP sockets).

In one embodiment, the mobile device may identify any existing transport layer connection when the transition to the active radio state occurs. In this example, the mobile device may identify the long-lived TCP connection as existing at the time of the transition. While the mobile device is in the active power state, the mobile device may periodically count the number of opened and closed TCP connections to determine the net count. As can be seen from this example, the net count reaches zero at time $t_6$. When this occurs, the mobile device may initiate a fast dormancy procedure. This may include generating the SCRI message to send to the RAN. Upon receiving the SCRI, the RAN may transition the radio connection between the mobile device and the base station in the RAN to a low power state. In one example, the net count may be less than zero if the long-lived TCP connection 605 closes while the mobile device is in the active radio state. For instance, the connection 605 may close prior to time $t_6$. Thus, in this example, the net count may be negative one, and the UE may initiate the fast dormancy procedure to transition to an inactive radio state.

Figure 7:
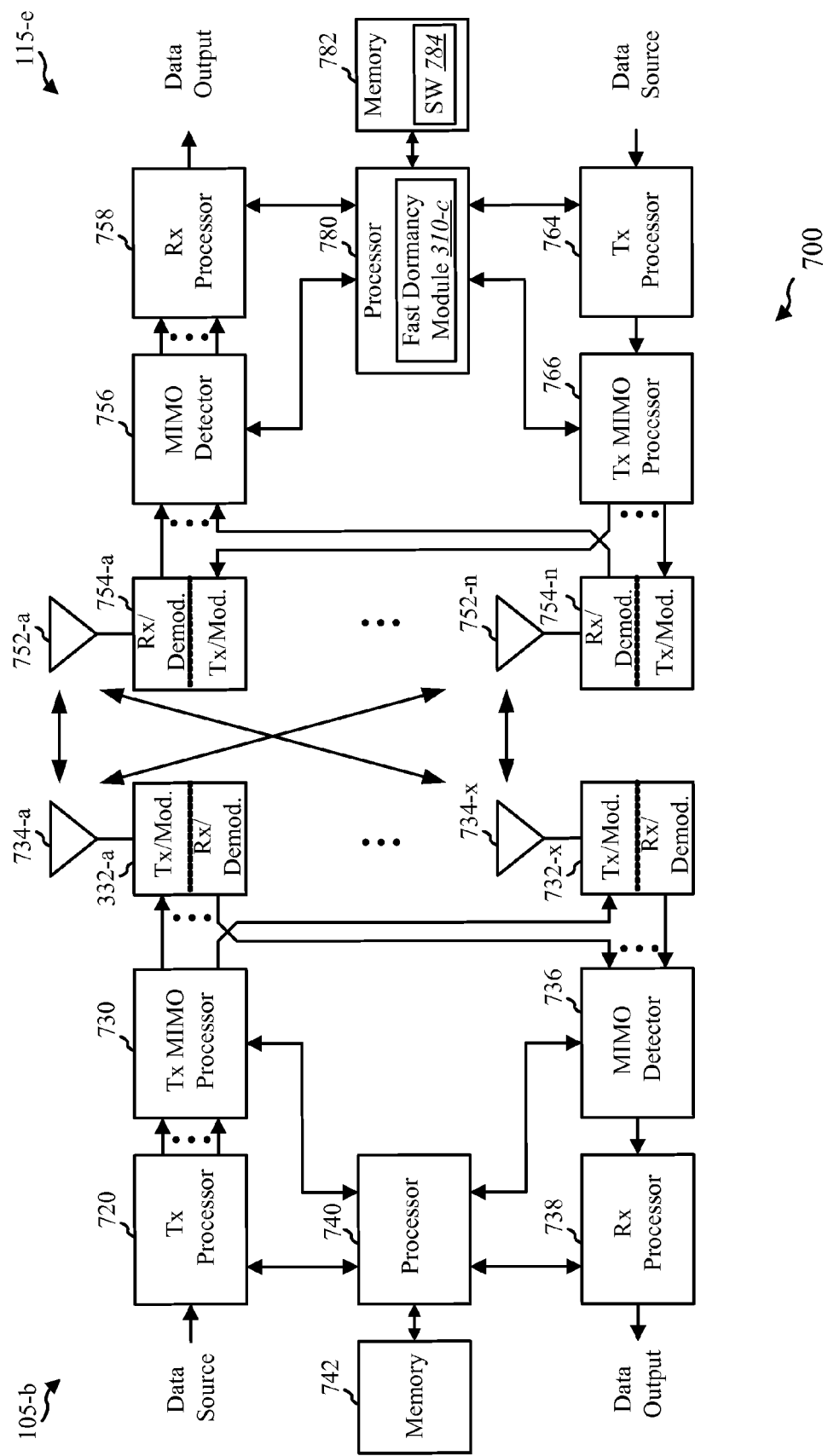
FIG. 7 is a block diagram of a MIMO communication system including a base station and a mobile device.

FIG. 7 is a block diagram of a MIMO communication system 700 including a base station 105-b and a mobile device 115-e. This system 700 may illustrate aspects of the system 100 of FIG. 1 and/or system 200 of FIG. 2. The base station 105-b may be equipped with antennas 734-a through 734-x, and the mobile device 115-e may be equipped with antennas 752-a through 752-n. In the system 700, the base station 105-b may be able to send data over multiple communication links at the same time. Each communication link may be called a "layer" and the "rank" of the communication link may indicate the number of layers used for communication. For example, in a 2×2 MIMO system where base station 105-b transmits two "layers," the rank of the communication link between the base station 105-b and the mobile device 115-e is two.

At the base station 105-b, a transmit processor 720 may receive data from a data source. The transmit processor 720 may process the data. The transmit processor 720 may also generate reference symbols, and a cell-specific reference signal. A transmit (TX) MIMO processor 730 may perform spatial processing (e.g., precoding) on data symbols, control symbols, and/or reference symbols, if applicable, and may provide output symbol streams to the transmit modulators 732-a through 732-x. Each modulator 732 may process a respective output symbol stream (e.g., for OFDM, etc.) to obtain an output sample stream. Each modulator 732 may further process (e.g., convert to analog, amplify, filter, and upconvert) the output sample stream to obtain a downlink (DL) signal. In one example, DL signals from modulators 732-a through 732-x may be transmitted via the antennas 734-a through 734-x, respectively.

At the mobile device 115-e, the mobile device antennas 752-a through 752-n may receive the DL signals from the base station 105-b and may provide the received signals to the demodulators 754-a through 754-n, respectively. Each demodulator 754 may condition (e.g., filter, amplify, downconvert, and digitize) a respective received signal to obtain input samples. Each demodulator 754 may further process the input samples (e.g., for OFDM, etc.) to obtain received symbols. A MIMO detector 756 may obtain received symbols from all the demodulators 754-a through 754-n, perform MIMO detection on the received symbols if applicable, and provide detected symbols. A receive processor 758 may process (e.g., demodulate, deinterleave, and decode) the detected symbols, providing decoded data for the mobile device 115-e to a data output, and provide decoded control information to a processor 780, or memory 782.

On the uplink (UL), at the mobile device 115-e, a transmit processor 764 may receive and process data from a data source. The transmit processor 764 may also generate reference symbols for a reference signal. The symbols from the transmit processor 764 may be precoded by a transmit MIMO processor 766 if applicable, further processed by the demodulators 754-a through 754-n (e.g., for SC-FDMA, etc.), and be transmitted to the base station 105-b in accordance with the transmission parameters received from the base station 105-b. At the base station 105-b, the UL signals from the mobile device 115-e may be received by the antennas 734, processed by the demodulators 732, detected by a MIMO detector 736 if applicable, and further processed by a receive processor. The receive processor 738 may provide decoded data to a data output and to the processor 740. The components of the mobile device 115-e may, individually or collectively, be implemented with one or more Application Specific Integrated Circuits (ASICs) adapted to perform some or all of the applicable functions in hardware. Each of the noted modules may be a means for performing one or more functions related to operation of the system 700. Similarly, the components of the base station 105-b may, individually or collectively, be implemented with one or more Application Specific Integrated Circuits (ASICs) adapted to perform some or all of the applicable functions in hardware. Each of the noted components may be a means for performing one or more functions related to operation of the system 700.

The communication networks that may accommodate some of the various disclosed embodiments may be packet-based networks that operate according to a layered protocol stack. For example, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use Hybrid ARQ (HARQ) to provide retransmission at the MAC layer to improve link efficiency. At the Physical layer, the transport channels may be mapped to Physical channels.

As illustrated in FIG. 7, the processor 780 of the mobile device 115-e may include a fast dormancy module 310-c. The fast dormancy module 310-c may be an example of the fast dormancy module 310 of FIG. 3, 4, or 5. In one example, the processor 780 may include an intelligent hardware device, e.g., a central processing unit (CPU) such as the Snapdragon made by Qualcomm, a microcontroller, an application specific integrated circuit (ASIC), etc. The CPU may execute or run applications and an operating system installed on the mobile device 115-e. As a result, the CPU may be referred to as an application processor. In one configuration, the CPU may enter a lower power state (power collapse) to conserve power. While in the lower power state, the CPU may not process data received via a radio connection. Thus, a dormancy procedure may be initiated for the radio connection when the CPU is about to transition to the low power state. The dormancy procedure may result in the radio connection being torn down while the CPU is in the low power state and the mobile device 115-e is in a standby state.

Figure 8:
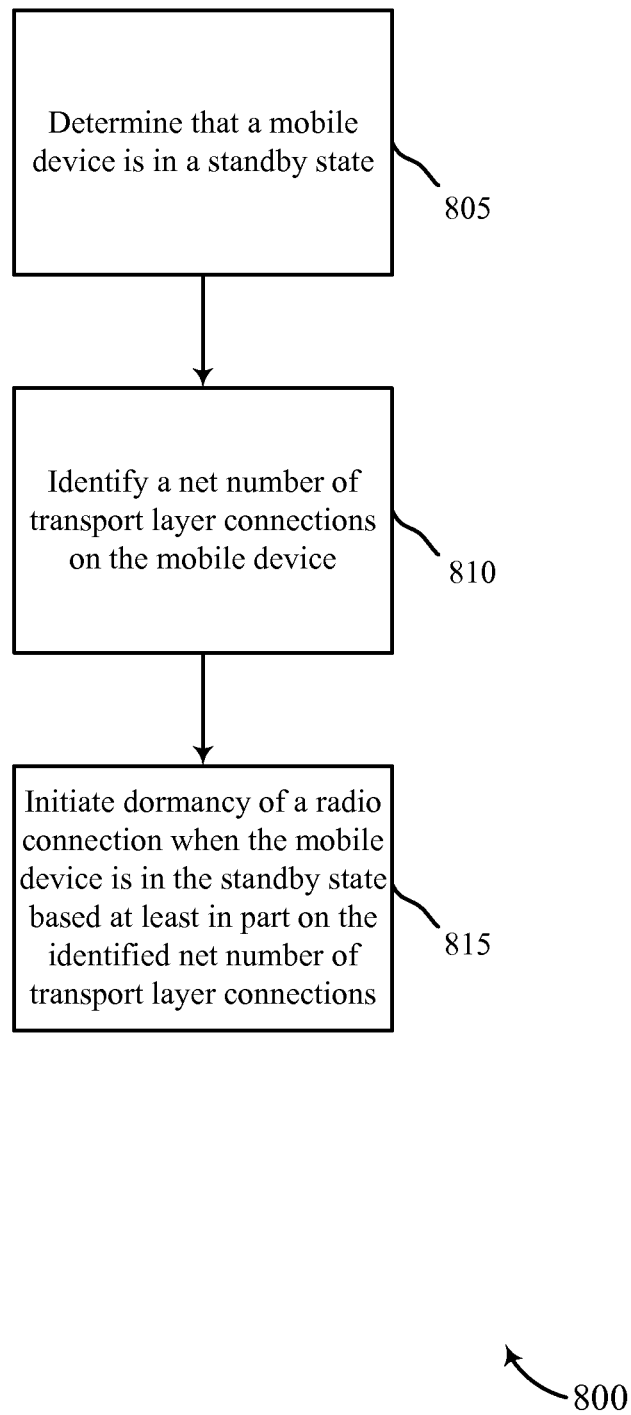
FIG. 8 is a flow chart illustrating one example of a method for determining when to initiate dormancy of a radio connection.

FIG. 8 is a flow chart illustrating one example of a method 800 for determining when to initiate dormancy of a radio connection. For clarity, the method 800 is described below with reference to the mobile device 115 shown in FIG. 1,2, 3, 4, 5, or 7. In one implementation, the processor module 780 may execute one or more sets of codes to control the functional elements of the mobile device 115 to perform the functions described below. In particular, the fast dormancy module 310 may execute one or more sets of codes to control the functional elements of the mobile device 115 to perform the functions described below.

At block 805, a determination may be made that the mobile device 115 is in a standby state. The determination may be made by classifying a screen of the mobile device 115 as being in an inactive mode. The screen may be inactive when it is powered off, when a power supply of the mobile device 115 is below a certain threshold, when user input has not been received via the screen for a certain period of time, etc.

At block 810, a net number of transport layer connections on the mobile device 115 may be identified. The connections may be open sockets (e.g., TCP sockets, UDP sockets) between the mobile device 115 and a server of a network, such as the Internet. The transport layer connections may be used to transmit/receive data between the mobile device 115 and the server. A radio connection between the mobile device 115 and a base station 105 may enable the data to be transmitted/received via the sockets.

At block 815, dormancy of the radio connection may be initiated, when the mobile device 115 is in the standby state, based at least in part on the identified net number of transport layer connections. A SCRI may be generated to inform the base station 105 of the RAN that the radio connection is no longer needed. As a result, the RAN may transition the radio connection to a low power state by releasing the connection between the mobile device 115 and the base station 105.

Therefore, the method 800 may provide for efficient initiation of dormancy for a radio connection to conserve power and resources of the mobile device 115 and the base station 105. It should be noted that the method 800 is just one implementation and that the operations of the method 800 may be rearranged or otherwise modified such that other implementations are possible.

Figure 9:
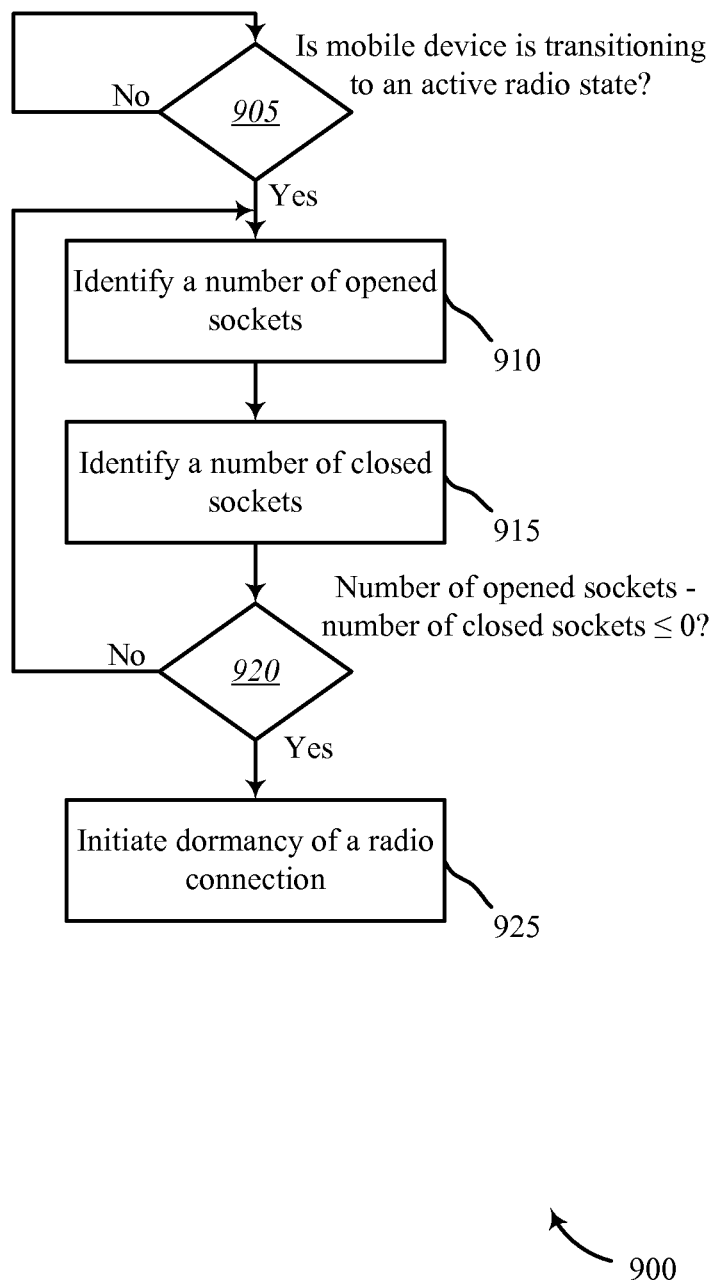
FIG. 9 is a flow chart illustrating one example of a method for determining when to initiate dormancy of a radio connection based on a net count of open sockets.

FIG. 9 is a flow chart illustrating one example of a method 900 for determining when to initiate dormancy of a radio connection based on a net count of open sockets. For clarity, the method 900 is described below with reference to the mobile device 115 shown in FIG. 1,2, 3, 4, 5, or 7. In one implementation, the processor module 780 may execute one or more sets of codes to control the functional elements of the mobile device 115 to perform the functions described below. In particular, the fast dormancy module 310 may execute one or more sets of codes to control the functional elements of the mobile device 115 to perform the functions described below.

At block 905, a determination may be made as to whether the mobile device 115 is transitioning to an active radio state. For example, a determination may be made as to whether a radio connection between the mobile device 115 and a device of a RAN is transitioning from a low power (e.g., idle) state to a higher power state (e.g., FACH or DCH state). If it is determined that the mobile device 115 is not transitioning to the active radio state, the method 900 may continue to determine whether the radio connection is transitioning to an active radio state. If, however, it is determined 905 that the mobile device 115 is transitioning to the active radio state, the method 900 may continue to block 910.

At block 910, a number of opened sockets may be identified. For example, the number of sockets opened during the transition to the active state and throughout the course of the active state may be identified. At block 915, a number of closed sockets may be identified. For example, the number of sockets closed during the transition to the active state and throughout the course of the active state may be identified.

At block 920, a determination may be made as to whether the number of opened sockets minus the number of closed sockets is less than or equal to zero. For example, the number of transport layer sockets closed during the active radio state may be subtracted from the number of transport layer sockets opened during the active radio state. If it is determined that the number of opened sockets minus the number of closed sockets is not less than or equal to zero, then the method 900 continues to identify the number of opened sockets and the number of closed sockets at blocks 910 and 915, respectively. Upon determining that the number of opened sockets minus the number of closed sockets (e.g., the net number of open sockets) is less than or equal to zero, the method 900 continues to block 925 where dormancy of the radio connection may be initiated.

Therefore, the method 900 may provide for efficient initiation of dormancy for a radio connection to conserve power and resources of the mobile device 115 and the base station 105. It should be noted that the method 900 is just one implementation and that the operations of the method 900 may be rearranged or otherwise modified such that other implementations are possible.

Figure 10:
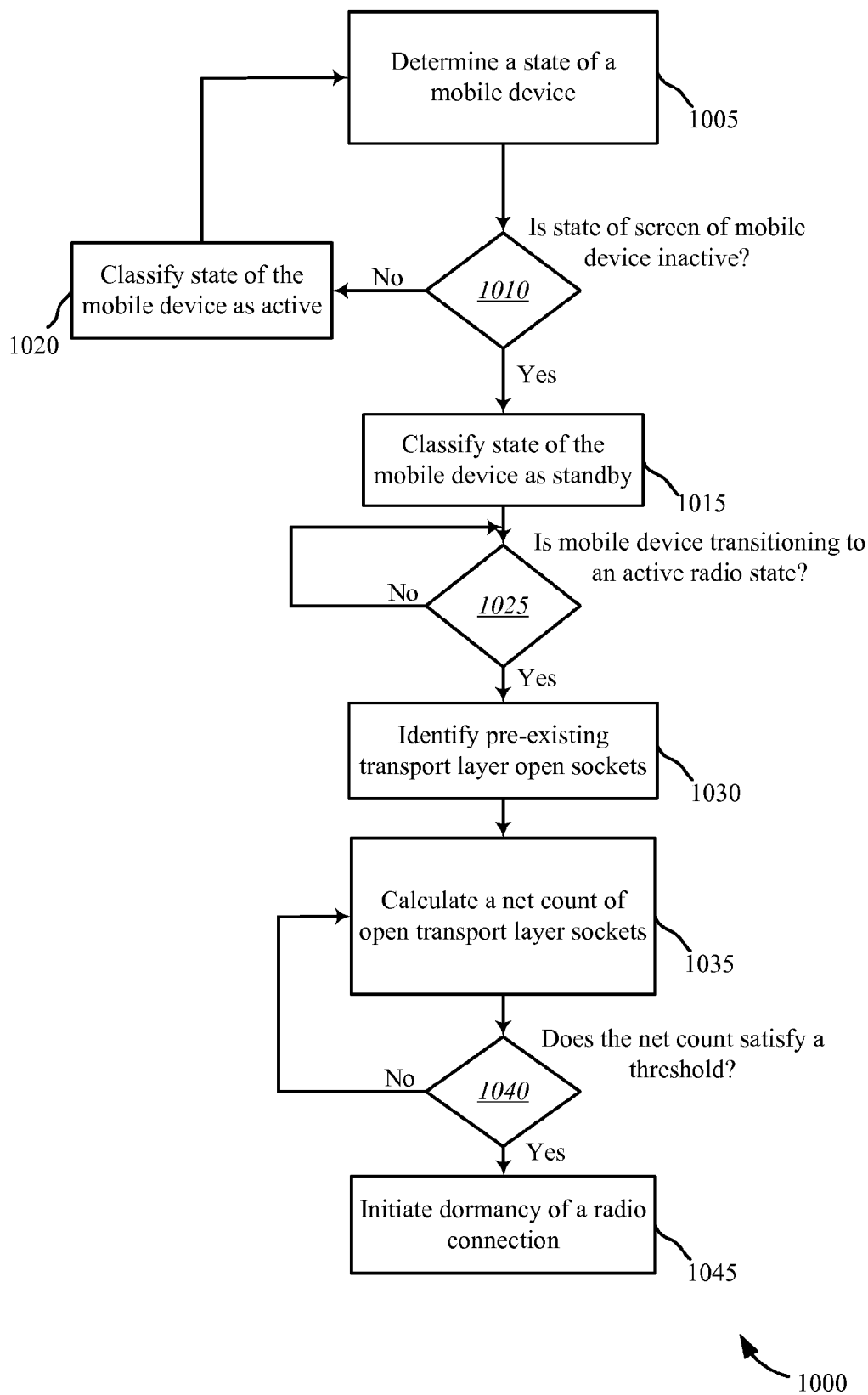
FIG. 10 is a flow chart illustrating one example of a method for initiating dormancy of a radio connection based on a net count of transport layer sockets.

FIG. 10 is a flow chart illustrating one example of a method 1000 for initiating dormancy of a radio connection based on a net count of transport layer sockets. For clarity, the method 1000 is described below with reference to the mobile device 115 shown in FIG. 1, 2, 3, 4, 5, or 7. In one implementation, the processor module 780 may execute one or more sets of codes to control the functional elements of the mobile device 115 to perform the functions described below. In particular, the fast dormancy module 310 may execute one or more sets of codes to control the functional elements of the mobile device 115 to perform the functions described below.

At block 1005, a state of a mobile device 115 may be determined. The determination may be made by analyzing certain characteristics of the terminal. For example, the determination may be based on the power status of the screen of the terminal (e.g., is the screen on or off), the time since the last user input was received via the screen, etc. In addition to using the state of the screen to determine the state of the mobile device 115, the state of connectors (Universal Serial Bus (USB), High-Definition Multimedia Interface (HDMI)) of the mobile device 115, the state of a microphone (e.g., on/off) of the mobile device 115, the state of audio playback, etc. may be used to determine the state of the mobile device 115.

At block 1010, a determination may be made as to whether the state of the screen is inactive. The screen may be determined to be inactive if the screen is powered off, if no input from the user via the screen for a certain amount of time, etc. If it is determined that the state of the screen is active, the method 1000 may continue to block 1020 where the state of the mobile device 115 is classified as active. If, however, it is determined that the state of the screen is inactive, at block 1015, the state of the mobile device 115 may be classified as standby.

At block 1025, while the mobile device 115 is in the standby state, a determination may be made as to whether the mobile device 115 is transitioning to an active radio state. For example, a determination may be made as to whether a radio connection between the mobile device 115 and a device of a RAN is transitioning from a low power (e.g., idle) state to a higher power state (e.g., FACH or DCH state). If it is determined that the mobile device 115 is not transitioning to the active radio state, the method may continue to determine whether the radio connection is transitioning to a higher power state. If, however, it is determined 1025 that the mobile device 115 is transitioning to the active radio state, at block 1030, pre-existing transport layer open sockets may be identified. For example, long-lived TCP connections in existence before the transition to a higher power state may be identified.

At block 1035, a net count of open transport layer sockets may be calculated over a specified time period. The time period may be while the radio connection is in the high power state. For example, the number of transport layer sockets closed during the active radio state may be subtracted from the number of transport layer sockets opened during the active radio state. A long-lived TCP connection that was in existence (e.g., opened) before the transition to the active radio state may not be counted as a transport layer socket that was opened while the radio connection is in a higher power state. In addition to (or in place of) counting the number of sockets opened and closed during the active radio state, the number of socket file descriptors opened and closed while the radio connection is active may be used to calculate the net count described above.

At block 1040, a determination may be made as to whether the calculated net count satisfies a threshold. For example, a net count that equals (or is less than) zero may satisfy the threshold. If it is determined that the net count does not satisfy the threshold, the method 1000 may return to block 1035 to calculate the net count of open transport layer sockets. If, however, it is determined that the net count does satisfy the threshold, at block 1045, dormancy of the radio connection may be initiated. The dormancy may be initiated by generating a SCRI to send to the base station 105 connected to the mobile device 115 via the radio connection. The RAN that includes the base station 105 may receive the SCRI and cause the radio connection to transition to an idle state. The transition may occur by the RAN releasing the radio connection between the mobile device 115 and the base station 105.

Therefore, the method 1000 may provide for initiating dormancy of the radio connection by the mobile device 115 as soon as the radio connection is no longer needed. This may result in power and resource savings for the mobile device 115 as well as a reduction in consumption of network resources for the RAN. It should be noted that the method 1000 is just one implementation and that the operations of the method 1000 may be rearranged or otherwise modified such that other implementations are possible.

Figure 11:
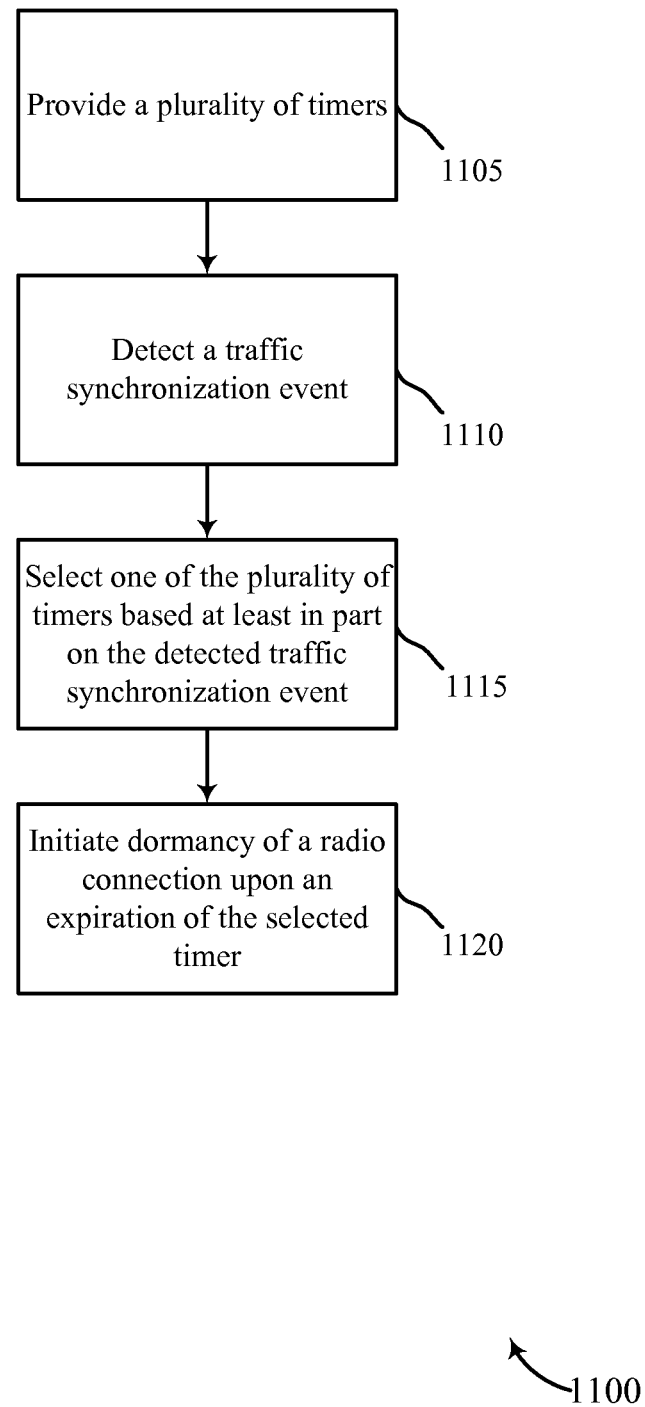
FIG. 11 is a flow chart illustrating another example of a method for determining when to initiate dormancy of a radio connection.

FIG. 11 is a flow chart illustrating another example of a method 1100 for determining when to initiate dormancy of a radio connection. For clarity, the method 1100 is described below with reference to the mobile device 115 shown in FIG. 1, 2, 3, 4, 5, or 7. In one implementation, the processor module 780 may execute one or more sets of codes to control the functional elements of the mobile device 115 to perform the functions described below. In particular, the fast dormancy module 310 may execute one or more sets of codes to control the functional elements of the mobile device 115 to perform the functions described below.

At block 1105, a plurality of timers (e.g., inactivity timers) may be provided. In one example, the plurality of timers may include a TCP connection closed inactivity timer, a sync traffic burst inactivity timer, a non-sync traffic burst inactivity timer, etc. At block 1110, a traffic synchronization event (e.g., triggering event) may be detected.

Examples of traffic synchronization events include a sync traffic burst and a non-sync traffic burst. It is noted that in some cases, multiple triggering events may occur simultaneously.

At block 1115, one of the plurality of timers may be selected based at least in part on the detected traffic synchronization event. For example, the timer that is associated with the detected traffic synchronization event may be selected. In some cases, one of the plurality of timers may be selected based at least in part on a closing of a TCP connection. In one example, each traffic synchronization event may be associated with a respective inactivity timer (e.g., the sync traffic burst inactivity timer, the non-sync traffic burst inactivity timer). A closing of a TCP connection may also have a respective inactivity timer (e.g., the TCP connection closed inactivity timer). In some cases, each of the plurality of timers may have a different timer duration (e.g., the duration of the TCP connection closed inactivity timer, the sync traffic burst inactivity timer, and the non-sync traffic burst inactivity timer may each be different). At block 1120, dormancy of the radio connection may be initiated upon expiration of the selected timer. A SCRI may be generated to inform the base station 105 of the RAN that the radio connection is no longer needed. As a result, the RAN may transition the radio connection to a low power state by releasing the connection between the mobile device 115 and the base station 105.

Therefore, the method 1100 may provide for efficient initiation of dormancy for a radio connection to conserve power and resources of the mobile device 115 and the base station 105. It should be noted that the method 1100 is just one implementation and that the operations of the method 1100 may be rearranged or otherwise modified such that other implementations are possible.

Figure 12:
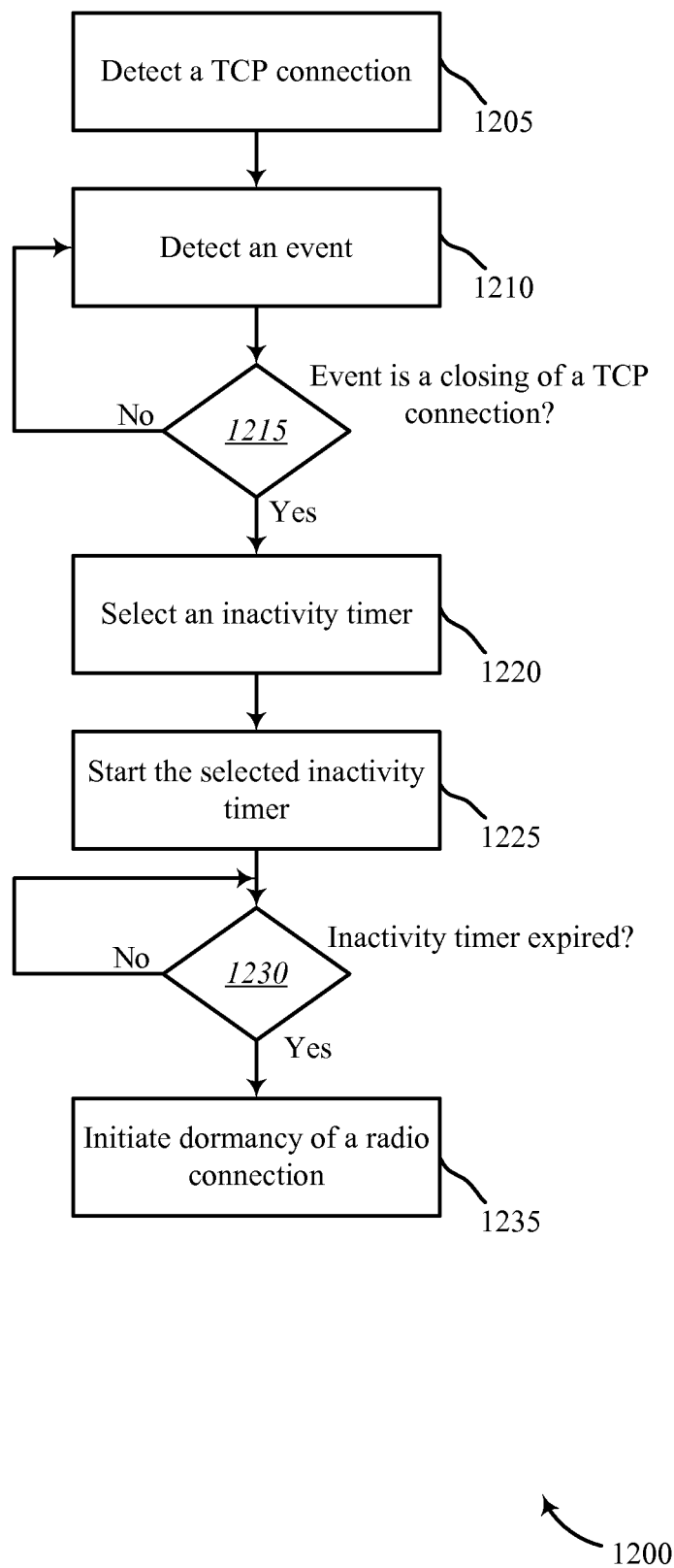
FIG. 12 is a flow chart illustrating one example of a method for determining when to initiate dormancy of a radio connection based on a closing of a TCP connection.

FIG. 12 is a flow chart illustrating one example of a method 1200 for determining when to initiate dormancy of a radio connection based on a closing of a TCP connection. For clarity, the method 1200 is described below with reference to the mobile device 115 shown in FIG. 1,2, 3, 4, 5, or 7. In one implementation, the processor module 780 may execute one or more sets of codes to control the functional elements of the mobile device 115 to perform the functions described below. In particular, the fast dormancy module 310 may execute one or more sets of codes to control the functional elements of the mobile device 115 to perform the functions described below.

At block 1205, a TCP connection may be detected. For example, each of the TCP connections may be detected. At block 1210 an event may be detected. At block 1215, a determination may be made as to whether the event is the closing of a TCP connection. If it is determined that the event is not a closing of a TCP connection, then the method 1200 may return to detecting an event. If however, it is determined that the event is a closing of a TCP connection, then at block 1220, an inactivity timer may be selected.

At block 1225, the selected inactivity timer may be started. For example, upon the closing of a TCP connection, the TCP connection closed inactivity timer may be started. At block 1230, a determination may be made as to whether the inactivity timer has expired. If it is determined that the selected inactivity timer has not expired, then the method 1200 continues to determine if the selected inactivity timer has expired. If however, it is determined that the selected inactivity timer has expired, then, at block 1235, dormancy of the radio connection may be initiated.

Therefore, the method 1200 may provide for efficient initiation of dormancy for a radio connection to conserve power and resources of the mobile device 115 and the base station 105. It should be noted that the method 1200 is just one implementation and that the operations of the method 1200 may be rearranged or otherwise modified such that other implementations are possible.

Figure 13:
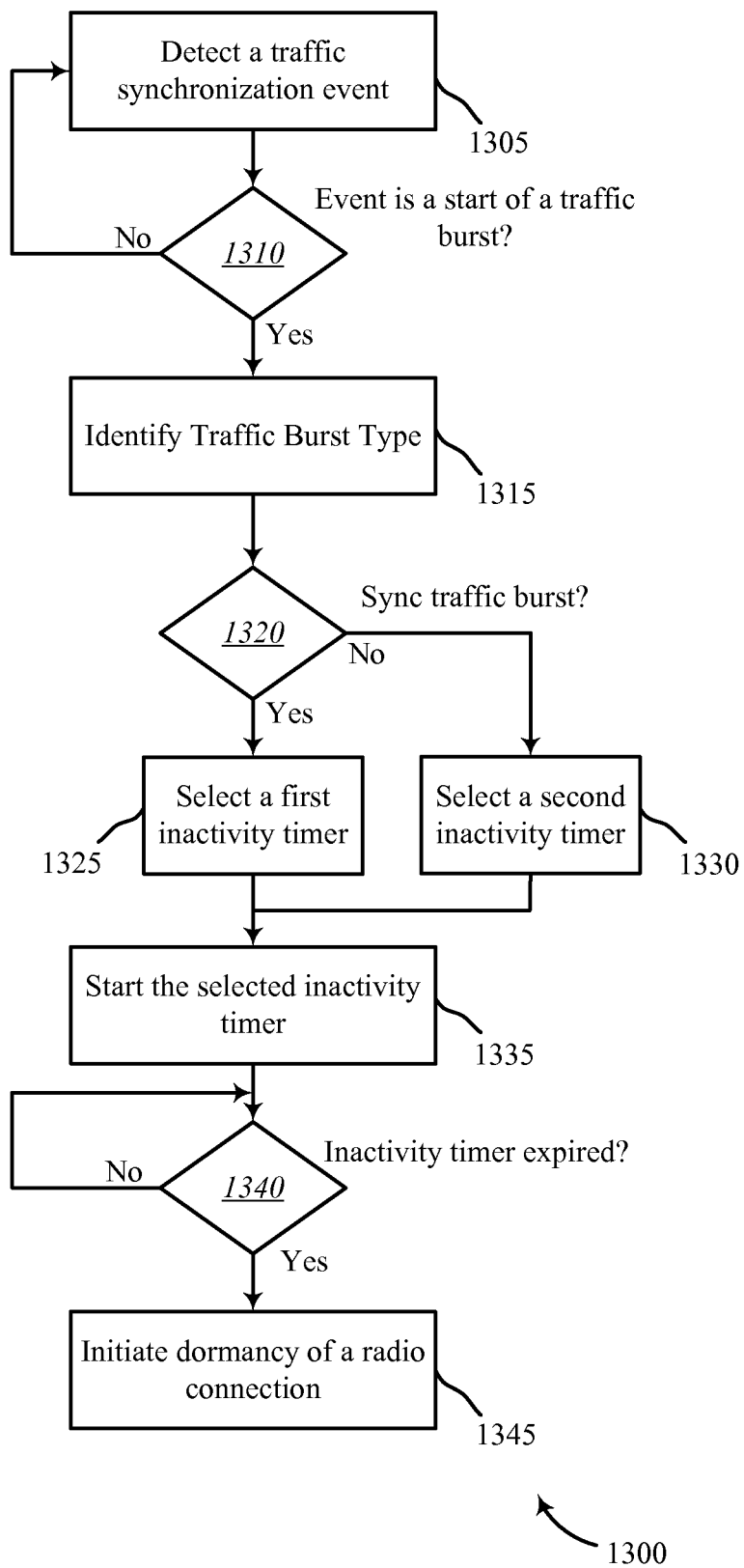
FIG. 13 is a flow chart illustrating one example of a method for determining when to initiate dormancy of a radio connection based on a traffic burst type.

FIG. 13 is a flow chart illustrating one example of a method 1300 for determining when to initiate dormancy of a radio connection based on a traffic burst type. For clarity, the method 1300 is described below with reference to the mobile device 115 shown in FIG. 1,2, 3, 4, 5, or 7. In one implementation, the processor module 780 may execute one or more sets of codes to control the functional elements of the mobile device 115 to perform the functions described below. In particular, the fast dormancy module 310 may execute one or more sets of codes to control the functional elements of the mobile device 115 to perform the functions described below.

At block 1305, a traffic synchronization event may be detected. At block 1310, a determination may be made as to whether the traffic synchronization event is a start of a traffic burst. If it is determined that the event is not a start of a traffic burst, then the method 1300 may return to detecting a traffic synchronization event. If however, it is determined 1310 that the event is a start of a traffic burst, then at block 1315, a traffic burst type may be identified.

At block 1320, a determination may be made as to whether the traffic burst is a sync traffic burst. If it is determined 1320 that the traffic burst is a sync traffic burst, then, at block 1325, a first inactivity timer (e.g., a sync traffic burst inactivity timer) may be selected. If, however, it is determined that the traffic burst is not a sync traffic burst, then, at block 1330, a second inactivity timer (e.g., non-sync traffic inactivity timer) may be selected.

At block 1335, the selected inactivity timer may be started. For example, upon the start of a sync traffic burst, the sync traffic burst inactivity timer may be started and upon the start of a non-sync traffic burst, the non-sync traffic burst inactivity timer may be started. At block 1340, a determination may be made as to whether the inactivity timer has expired. If it is determined 1340 that the selected inactivity timer has not expired, then the method 1300 continues to determine if the selected inactivity timer has expired. If however, it is determined 1340 that the selected inactivity timer has expired, then, at block 1345, dormancy of the radio connection may be initiated. In one embodiment, the value (i.e., length) of the sync traffic burst inactivity timer may be less than the value of the non-sync traffic burst inactivity timer.

Therefore, the method 1300 may provide for efficient initiation of dormancy for a radio connection to conserve power and resources of the mobile device 115 and the base station 105. It should be noted that the method 1300 is just one implementation and that the operations of the method 1300 may be rearranged or otherwise modified such that other implementations are possible.

Employing the techniques and structures disclosed herein, a mobile device (i.e., a UE) may initiate the dormancy procedure for a radio connection. The procedure may be initiated at an efficient time rather than waiting unnecessarily for an inactivity timer to expire. Further, the decision to initiate the procedure may be based, at least in part, on the net count of TCP sockets opened and closed while the mobile device is in an active radio state, a closing of a TCP connection, and/or a traffic burst type. Transitioning the radio connection of the mobile device to a low power state in an efficient manner reduces power and resource consumption by the mobile device in a standby state.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the exemplary embodiments of the invention.

The various illustrative logical blocks, modules, and circuits described in connection with the embodiments disclosed herein may be implemented or performed with a general purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a number of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary embodiments, the functions described may be implemented in hardware, software, firmware, or any combination thereof. If implemented in software, the functions may be stored on or transmitted over as one or more instructions or code on a non-transitory computer-readable medium or a computer-readable storage device. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above should also be included within the scope of computer-readable media.

The previous description of the disclosed exemplary embodiments is provided to enable any person skilled in the art to make or use the invention. Various modifications to these exemplary embodiments will be readily apparent to those skilled in the art, and the generic principles defined herein may be applied to other embodiments without departing from the spirit or scope of the invention. Thus, the invention is not intended to be limited to the exemplary embodiments shown herein but is to be accorded the widest scope consistent with the principles and novel features disclosed herein.

What is claimed is:

1. A method for wireless communication using a mobile device, comprising:
    determining that the mobile device is in a standby state based at least in part on a state of user interface component;
    identifying a number of pre-existing transport layer connections of the mobile device;
    identifying a net count of transport layer connections of the mobile device, wherein the net count of transport layer connections is based at least in part on the identified number of pre-existing transport layer connections, a number of open connections and a number of closed connections; and
    determining to initiate dormancy of a radio connection based at least in part on the mobile device being in the standby state and on the identified net count of transport layer connections satisfying a threshold.

2. The method of claim 1, wherein the identifying the net count of transport layer connections occurs during a specified time period.

3. The method of claim 2, wherein the specified time period comprises a time period that the mobile device is in an active radio state.

4. The method of claim 3, wherein the active radio state comprises a forward access channel (FACH) state, a data channel (DCH) state, or a connected state.

5. The method of claim 1, further comprising:
    determining that the mobile device is transitioning to an active radio state or transitioning out of the active radio state;
    wherein identifying the number of pre-existing transport layer connections is based at least in part on when the mobile device transitions to the active radio state or transitions out of the active radio state; and wherein the net count of transport layer connections is identified after the transition of the mobile device.

6. The method of claim 5, wherein the net count of transport layer connections is determined from a number of transport layer connections closed after the transition of the mobile device.

7. The method of claim 5, wherein the net count of transport layer connections is determined from a number of transport layer connections opened after the transition of the mobile device.

8. The method of claim 5, wherein the net count of transport layer connections is determined from a number of transport layer file descriptors closed after the transition of the mobile device.

9. The method of claim 5, wherein the net count of transport layer connections is determined from a number of transport layer file descriptors opened after the transition of the mobile device.

10. The method of claim 1, wherein the initiating dormancy of the radio connection occurs when a net count of transport layer connections is zero, or less than zero.

11. The method of claim 1, wherein determining the mobile device to be in the standby state further comprises:
determining that a screen of the mobile device is in an inactive state.

12. The method of claim 11, wherein the screen is determined to be in the inactive state when the screen is powered down.

13. The method of claim 11, wherein the screen is determined to be in the inactive state when a lack of input via the screen occurs for a predetermined period of time.

14. The method of claim 1, further comprising:
generating a signaling connection release indicator (SCRI) to initiate dormancy of the radio connection.

15. The method of claim 1, further comprising:
determining that the mobile device is transitioning to an active radio state,
wherein the number of pre-existing transport layer connections are identified when the mobile device transitions to the active radio state; and
periodically counting a number of transport layer connections in existence subsequent to the mobile device entering the active radio state,
wherein the net count of transport layer connections is identified while the mobile device is in the active radio state based at least in part on the periodic counting of transport layer connections.

16. A mobile device configured for wireless communication, comprising:
a processor;
a memory in electronic communication with the processor, the memory embodying instructions, the instructions being executable by the processor to:
determine that the mobile device is in a standby state based at least in part on a state of user interface component;
identify a number of pre-existing transport layer connections of the mobile device;
identify a net count of transport layer connections of the mobile device, wherein the net count of transport layer connections is based at least in part on the identified number of pre-existing transport layer connections, a number of open connections and a number of closed connections; and determine to initiate dormancy of a radio connection based at least in part on the mobile device being in the standby state and on the identified net count of transport layer connections satisfying a threshold.

17. The mobile device of claim 16, wherein the processor is further configured to identify the net count of transport layer connections during a specified time period.

18. The mobile device of claim 17, wherein the specified time period comprises a time period that the mobile device is in an active radio state.

19. The mobile device of claim 18, wherein the active radio state comprises a forward access channel (FACH) state, a data channel (DCH) state, or a connected state.

20. The mobile device of claim 16, wherein the processor is further configured to:
determine that the mobile device is transitioning to an active radio state, or transitioning out of the active radio state,
wherein the number of pre-existing transport layer connections is based at least in part on when the mobile device transitions to the active radio state or transitions out of the active radio state; and
wherein the net count of transport layer connections is identified after the transition of the mobile device.

21. The mobile device of claim 20, wherein the net count of transport layer connections is determined from a number of transport layer connections closed after the transition of the mobile device.

22. The mobile device of claim 20 wherein the net count of transport layer connections is determined from a number of transport layer connections opened after the transition of the mobile device.

23. The mobile device of claim 20, wherein the net count of transport layer connections is determined from a number of transport layer file descriptors closed after the transition of the mobile device.

24. The mobile device of claim 20, wherein the net count of transport layer connections is determined from a number of transport layer file descriptors opened after the transition of the mobile device.

25. The mobile device of claim 16, wherein the processor is further configured to determine to initiate dormancy of the radio connection when a net count of transport layer connections is zero, or less than zero.

26. The mobile device of claim 16, wherein the processor is further configured to determine that the mobile device is in the standby state by determining that a screen of the mobile device is in an inactive state.

27. The mobile device of claim 26, wherein the screen is determined to be in the inactive state when the screen is powered down.

28. The mobile device of claim 26, wherein the screen is determined to be in the inactive state when a lack of input via the screen occurs for a predetermined period of time.

29. The mobile device of claim 16, wherein the processor is further configured to:
generate a signaling connection release indicator (SCRI) to initiate dormancy of the radio connection.

30. The mobile device of claim 16, wherein the processor is further configured to:
determine that the mobile device is transitioning to an active radio state,
wherein the number of pre-existing transport layer connections are identified when the mobile device transitions to the active radio state; and periodically count a number of transport layer connections in existence subsequent to the mobile device entering the active radio state, wherein the net count of transport layer connections is identified while the mobile device is in the active radio state based at least in part on the periodic counting of transport layer connections.

31. An apparatus configured to manage radio connections, comprising:

means for determining that a mobile device is in a standby state based at least in part on a state of user interface component;

means for identifying a number of pre-existing transport layer connections of the mobile device;

means for identifying a net count of transport layer connections of the mobile device, wherein the net count of transport layer connections is based at least in part on the identified number of pre-existing transport layer connections, a number of open connections and a number of closed connections; and means for determining to initiate dormancy of a radio connection based at least in part on the mobile device being in the standby state and on the identified net count of transport layer connections satisfying a threshold.

32. The apparatus of claim 31, wherein the means for identifying the net count of transport layer connections occurs during a specified time period.

33. The apparatus of claim 32, wherein the specified time period comprises a time period that the mobile device is in an active radio state.

34. The apparatus of claim 31, further comprising:

means for determining that the apparatus is transitioning to an active radio state or transitioning out of the active radio state;

wherein identifying the number of pre-existing transport layer connections is based at least in part on when the apparatus transitions to the active radio state or transitions out of the active radio state; and wherein the net count of transport layer connections is identified after the transition of the apparatus.

35. The apparatus of claim 34, wherein the net count of transport layer connections is determined from a number of transport layer connections closed after the transition of the apparatus.

36. The apparatus of claim 34, wherein the net count of transport layer connections is determined from a number of transport layer connections opened after the transition of the apparatus.

37. The apparatus of claim 31, wherein the means for initiating dormancy of the radio connection occurs when a net count of transport layer connections is zero, or less than zero.

38. The apparatus of claim 31, wherein the means for determining that the apparatus is in the standby state further comprises:

means for determining that a screen of the apparatus is in an inactive state.

39. The apparatus of claim 31, further comprising:

means for generating a signaling connection release indicator (SCRI) to initiate dormancy of the radio connection.

40. A computer program product for managing radio connections, the computer program product comprising a non-transitory computer-readable medium storing executable instructions that, when executed by a processor, cause the processor to:

determine that a mobile device is in a standby state based at least in part on a state of user interface component;

identify a number of pre-existing transport layer connections of the mobile device;

identify a net count of transport layer connections of the mobile device wherein the net count of transport layer connections is based at least in part on the identified number of pre-existing transport layer connections, a number of open connections and a number of closed connections; and determine to initiate dormancy of a radio connection based at least in part on the mobile device being in the standby state and on the identified net count of transport layer connections satisfying a threshold.

* * * * *